United States Patent
Tago et al.

(10) Patent No.: US 8,195,686 B2
(45) Date of Patent: Jun. 5, 2012

(54) SEARCH METHOD AND SEARCH PROGRAM

(75) Inventors: Shinichiro Tago, Kawasaki (JP);
Masahiko Nagata, Kawasaki (JP);
Tatsuya Asai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 322 days.

(21) Appl. No.: 12/479,133

(22) Filed: Jun. 5, 2009

(65) Prior Publication Data

US 2010/0049712 A1 Feb. 25, 2010

(30) Foreign Application Priority Data

Aug. 25, 2008 (JP) ................................ 2008-215645

(51) Int. Cl.
*G06F 17/30* (2006.01)
(52) U.S. Cl. ........................................ 707/769; 707/801
(58) Field of Classification Search .................. 707/769, 707/776, 999.006, 801
See application file for complete search history.

(56) References Cited

U.S. PATENT DOCUMENTS

| | | | | |
|---|---|---|---|---|
| 5,452,451 A | * | 9/1995 | Akizawa et al. ...................... 1/1 |
| 5,471,610 A | * | 11/1995 | Kawaguchi et al. .......... 707/610 |
| 5,706,496 A | * | 1/1998 | Noguchi et al. ....................... 1/1 |
| 7,089,227 B2 | * | 8/2006 | Abe et al. .............................. 1/1 |
| 7,359,895 B2 | * | 4/2008 | Chang et al. .......................... 1/1 |
| 7,734,614 B2 | * | 6/2010 | Aoki et al. ..................... 707/711 |
| 2008/0022260 A1 | * | 1/2008 | Kinder et al. ................. 717/116 |

FOREIGN PATENT DOCUMENTS

JP 2003-203093 A 7/2003

OTHER PUBLICATIONS

Machine Translated Japanese Patent No. 2003-203093;Jul. 18, 2003; Watanabe et al; pp. 1-10.*

* cited by examiner

*Primary Examiner* — Monica Pyo
(74) *Attorney, Agent, or Firm* — Fujitsu Patent Center

(57) ABSTRACT

A search device creates as many stack frames as the number obtained by adding one to the number of search condition character strings contained in an out-of-search-condition character string in a stack, sequentially inputs character strings in a text into automaton data, determines whether the character strings in the text hit the search condition character string or the out-of-search-condition character string to push correspondence to the stack or to change correspondence into non-correspondence, and determines whether the text is to be searched.

8 Claims, 29 Drawing Sheets

FIG.1
EXAMPLE: タンタン麺とロースとタンを頼んで、タンタン麺を食べた。
☐☐☐ ～ STACK     STEP S10
☐☐○ ～ STACK     STEP S11
     タン
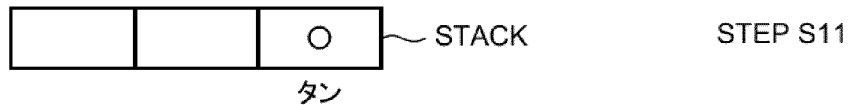
☐○○ ～ STACK     STEP S12
 タン タン

FIG.2
STEP S13
STEP S14
STEP S15
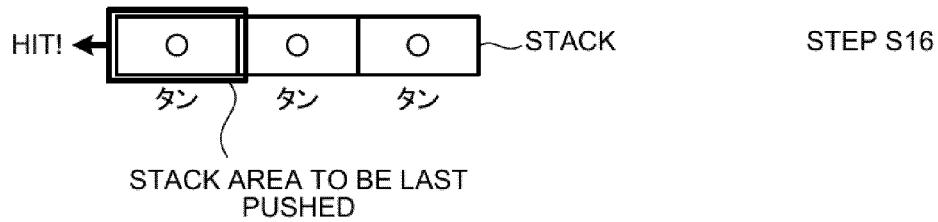
STEP S16
FIG.3
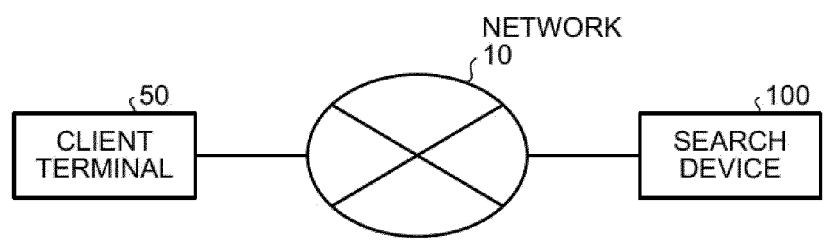

TEXT MANAGEMENT TABLE
150a

| TEXT IDENTIFICATION NUMBER | TEXT |
|---|---|
| 1001 | タンタン麺とロースとタンを頼んで、タンタン麺を食べた。 |
| 1002 | タンタン麺を注文した。 |
| 1003 | タンタン麺とカルビとビールを注文した。 |
| 1004 | 牛タンとカルビを頼んで、牛タンを食べた。 |
| 1005 | カルビとタンタン麺を食べた。 |
| ... | ... |

AUTOMATON DATA
150b

ACCEPTANCE STATE
MANAGEMENT TABLE
150d

| NODE ID | STACK PROCESSING INDICATION FIELD | |
|---|---|---|
| 1 | 0 | 0 |
| 2 | 0 | 0 |
| 3 | 1 | -1 |
| 4 | 1 | 0 |
| 5 | 0 | 0 |
| 6 | 1 | -2 |

DETERMINATION
RESULT TABLE
150e

| TEXT IDENTIFICATION NUMBER | DETERMINATION RESULT |
|---|---|
| 1001 | 1 |
| 1002 | 0 |
| 1003 | 0 |
| 1004 | 1 |
| 1005 | 0 |
| ... | ... |

FIG.10

ACCEPTANCE STATE MANAGEMENT TABLE
150d

| NODE ID | STACK PROCESSING INDICATION FIELD | |
|---|---|---|
| 20 | 0 | 0 |
| 21 | 1 | 0 |
| 22 | 1 | 0 |
| 23 | 0 | 0 |
| 24 | 0 | 0 |
| 25 | 1 | 0 |
| 26 | 0 | -3 |
| 27 | 1 | 0 |
| 28 | 1 | 0 |
| 29 | 0 | -2 |
| 30 | 0 | 0 |
| 31 | 0 | -4 |
| 32 | 0 | 0 |
| 33 | 1 | 0 |
| 34 | 1 | 0 |
| 35 | 0 | -2 |

FIG.32
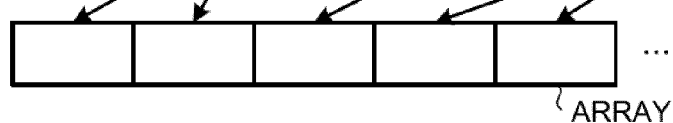
STEP S20
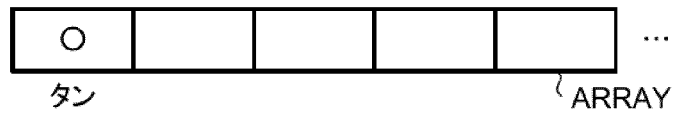
STEP S21
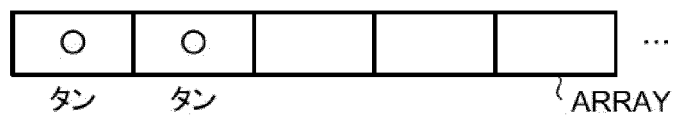
STEP S22

FIG.33
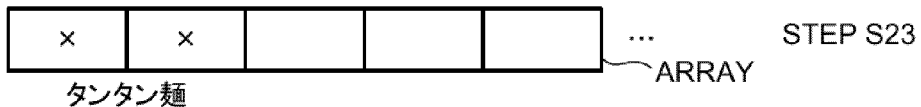
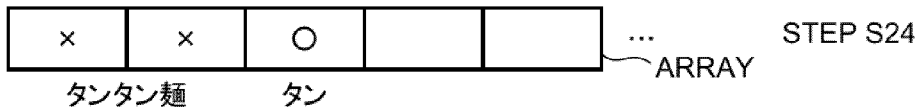
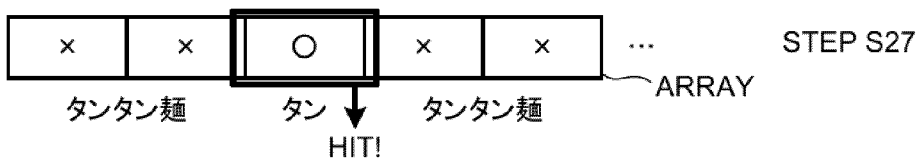

SEARCH METHOD AND SEARCH PROGRAM

CROSS-REFERENCE TO RELATED APPLICATION(S)

This application is based upon and claims the benefit of priority of the prior Japanese Patent Application No. 2008-215645, filed on Aug. 25, 2008, the entire contents of which are incorporated herein by reference.

FIELD

The embodiment(s) discussed herein is (are) directed to a search method and search program for searching a text.

BACKGROUND

A problem was required to be eliminated in which when designating a keyword as a search condition (hereinafter, search condition character string) and searching the full text, a text containing only a keyword similar to the search condition character string is erroneously searched. For example, if "京都" (Kyoto) is designated as a search condition character string for searching, a text such as "東京都で実施されている" (Tokyo-to de jissi sareteiru) may have been searched (since 東京都 (Tokyo-to) and "京都" (Kyoto) are different from each other, "東京都で実施されている" (Tokyo-to de jissi sareteiru) should not have been searched).

Conventionally, the morphological analysis method and the Ngram method are widely known as a text search technique but each method has the following disadvantages. In the morphological analysis method, "東京都" (Tokyo-to) is not a hit even when searching is carried out by "京都" (Kyoto). In the morphological analysis method, however, a search dictionary needs to be previously defined and uncommon and strange search words and phrases are not contained in the dictionary definitions for searching for new words/phrases and minor words/phrases, and consequently perfect definition is impossible even when redefining is frequently performed, and a large load is imposed on the definition work.

On the contrary, in the Ngram method in which an input text is "delimited by character strings of N characters", the words contained in the text are ignored and the text is recognized as words in units of N characters so that a dictionary as in the morphological analysis method is not required. However, a text containing "東京都" (Tokyo-to) is output when searching is carried out by "京都" (Kyoto), while even a text containing both "京都" (Kyoto) and "東京都" (Tokyo-to) (such as a text of "京都と東京都で実施されている" (Kyoto to Tokyo-to de jissi sareteiru)) is not output when the searching with "東京都" (Tokyo-to) designated as exclusion condition (the searching when a search condition character string is contained in an exclusion condition character string) is conducted.

As a supplement for the disadvantage of the Ngram method, a position in which a hit keyword is present (address) is held and character strings before and after the hit keyword are extracted to confirm whether the extracted character strings are an exclusion condition character string so that a text containing the search condition character string (such as a text of "京都と東京都で実施されている" (Kyoto to Tokyo-to de jissi sareteiru)) can be searched even when "京都" (Kyoto) is designated as the search condition character string and "東京都" (Tokyo-to) is designated as the exclusion condition character string (see Japanese Laid-open Patent Publication No. 2003-203093, for example).

Since the amount of memory consumption for holding an address increases and a confirmation needs to be made as to whether a character string is an exclusion condition character string even when a conventional search method for compensating for the disadvantages of the Ngram method is used, there is a problem that a search processing can not be performed rapidly.

SUMMARY

According to an aspect of an embodiment, a search method includes acquiring a search condition character string indicating a keyword as a search condition of a text and an out-of-search-condition character string indicating a keyword out of the search condition; extracting a text from a storage device storing a plurality of texts therein; sequentially matching character strings in the text with the search condition character string and the out-of-search-condition character string; registering correspondence in a storage unit if the character string in the text hits the search condition character string; changing as many correspondences registered in the storage unit as the number of the search condition character strings contained in the out-of-search-condition character string into non-correspondence if the character string in the text hits the out-of-search-condition character string; and outputting the text extracted from the storage device as a search result if correspondence remains in the storage unit.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF DRAWING(S)

FIG. 1 is a diagram for explaining an outline and characteristics of a search device according to a first embodiment;

FIG. 2 is a diagram for explaining the outline and characteristics of the search device according to the first embodiment;

FIG. 3 is a diagram of a structure of a search system including the search device according to the first embodiment;

FIG. 10 is a diagram of one example of an acceptance state management table corresponding to automaton data 150b depicted in FIG. 9;

FIG. 32 is a diagram for explaining a processing of a search device according to a second embodiment;

FIG. 33 is a diagram for explaining the processing of the search device according to the second embodiment.

DESCRIPTION OF EMBODIMENT(S)

Figures 4, 5:
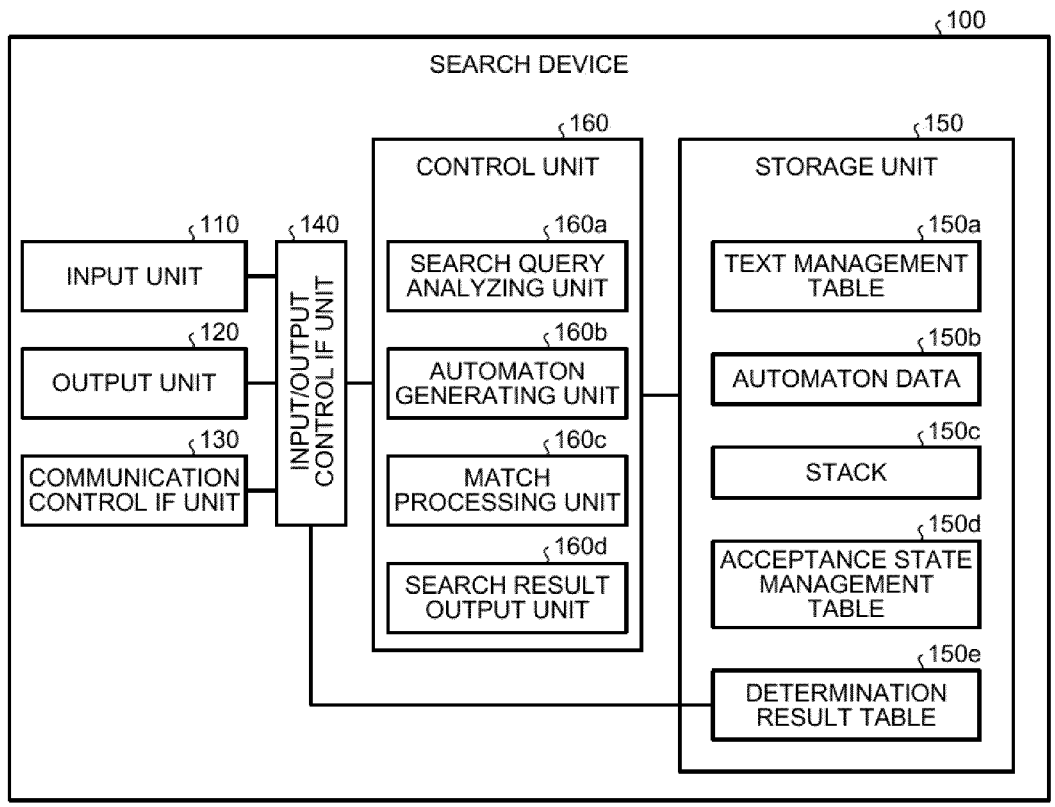
FIG. 4 is a functional block diagram of a structure of the search device according to the first embodiment.
FIG. 5 is a diagram of one example of a data structure of a text management table according to the first embodiment.

Exemplary embodiments of a search method and a search program according to the present invention will be explained below in detail with reference to the accompanying drawings.

At first, an outline and characteristics of a search device according to a first embodiment will be explained. FIGS. 1 and 2 are diagrams for explaining the outline and the characteristics of the search device according to the first embodiment. The search device according to the first embodiment acquires a keyword as a text search condition and a keyword out of the search condition (in the following explanation, a keyword as a text search condition is denoted as a search condition character string and a keyword out of the search condition is denoted as an out-of-search-condition character string).

The search device creates as many stack frames as the number obtained by adding one to the number of search condition character strings contained in the out-of-search-condition character string, extracts a text from a storage device, sequentially matches character strings in the extracted text with the search condition character string and the out-of-search-condition character string, and if a character string in the text matches with the search condition character string, pushes the correspondence to the stack frame.

On the other hand, if a character string in the text hits the out-of-search character string, as many correspondences as the number of the search condition character strings contained in the out-of-search-condition character string are sequentially changed into non-correspondence from the correspondence last registered in the stack frame. If a correspondence remains in the stack frame, the search device outputs the text extracted from the storage device as a search result.

Alternatively, if the correspondence is pushed to a stack area to be last pushed among the stack areas contained in the stack frame, the search device outputs the text extracted from the storage device as a search result.

The outline of the search device will be explained with a specific example. As one example, it is assumed that the search condition character string is "タン"(tan), the out-of-search-condition character string is "タンタン麺"(tantanmen), and a text extracted from the storage device is "タンタン麺とロースとタンを頼んで、タンタン麺を食べた。" (tantanmen to rohsu to tan o tanonde tantanmen o tabeta).

At first, the search device creates as many stack frames as the number obtained by adding one to the number of search condition character strings contained in the out-of-search-condition character string. Since the out-of-search-condition character string "タンタン麺"(tantanmen) contains two search condition character strings "タン"(tan), the search device creates three stack frames in total (Step S10).

Subsequently, the search device sequentially matches the character string in the text "タンタン麺とロースとタンを頼んで、タンタン麺を食べた。" (tantanmen to rohsu to tan o tanonde tantanmen o tabeta) with the search condition character string "タン"(tan) and the out-of-search-condition character string "タンタン麺"(tantanmen), if the character string in the text hits the search condition character string, pushes the correspondence (o) to the stack frame, and if the character string in the text hits the out-of-search-condition character string, sequentially changes as many correspondence (o) as the number of the search condition character strings contained in the out-of-search-condition character string into the non-correspondence (x) from the correspondence (o) last registered in the stack frame.

In the example depicted in FIG. 1, since the second character in the character string of the text hits "タン"(tan), the search device pushes the correspondence (o) to the stack (Step S11). Then, since the fourth character in the character string of the text hits "タン"(tan), the search device pushes the correspondence (o) to the stack (Step S12).

Proceeding to the explanation of FIG. 2, since the fifth character in the character string of the text hits "タンタン麺" (tantanmen), the search device sequentially changes as many correspondences (o) as two "タン"(tan) contained in "タンタン麺" (tantanmen) into the non-correspondence (x) from the correspondence (o) last registered in the stack frame (Step S13).

Subsequently, since the 12th character in the character string of the text hits "タン"(tan), the search device pushes the correspondence (o) to the stack (Step S14). Further, since the 19th character in the character string of the text hits "タン"(tan), the search device pushes the correspondence (o) to the stack (Step S15).

Since the 21st character in the character string of the text hits "タン"(tan), the search device pushes the correspondence (o) to the stack (Step S16). At Step S16, since the correspondence (o) is pushed to the stack area to be last pushed among the stack areas contained in the stack frame, the text "タンタン麺とロースとタンを頼んで、タンタン麺を食べた。" (tantanmen to rohsu to tan o tanonde tantanmen o tabeta) extracted from the storage device is output as a detection result.

In this manner, since the search device according to the first embodiment sequentially matches the text with the search condition character string and the out-of-search-condition character string and pushes the correspondence (o) to the stack or changes the correspondence (o) pushed to the stack into the non-correspondence (x) to detect the text to be searched, it is possible to rapidly search for the text to be searched without analyzing a structure of the text to be searched or holding an address of each keyword, thereby restricting the memory usage.

Next, a structure of a search system including the search device according to the first embodiment will be explained. FIG. 3 is a diagram of the structure of the search system including the search device according to the first embodiment. As depicted in FIG. 3, the search system has a client terminal 50 and a search device 100, where the client terminal 50 and the search device 100 are connected with each other via a network 10.

When a search query is input into the client terminal 50 from a user via an input device (not depicted in the drawings), the client terminal 50 transmits the search query to the search device 100 and outputs a search result from the search device 100 to an output device (not depicted in the drawings). The search query transmitted from the client terminal 50 contains information on the search condition character string and the out-of-search-condition character string.

When receiving the search query from the client terminal 50, the search device 100 searches for the relevant text on the basis of the search condition character string and the out-of-search-condition character string contained in the search query, and outputs a search result to the client terminal 50.

FIG. 4 is a functional block diagram of a structure of the search device 100 according to the first embodiment. As depicted in FIG. 4, the search device 100 includes an input unit 110, an output unit 120, a communication control IF (interface) unit 130, an input/output control IF unit 140, a storage unit 150 and a control unit 160.

Among the units, the input unit 110 is directed for inputting various items of information and is constituted of, for example, a keyboard, a mouse, a microphone and the like. A monitor (output unit 120) described later also realizes a pointing device function in cooperation with the mouse.

The output unit 120 is directed for outputting various items of information and is constituted of, for example, a monitor (or a display, a touch panel), a speaker and the like. The communication control IF unit 130 is directed for controlling communication mainly with the client terminal 50. The input/output control IF unit 140 is directed for controlling data input/output via the input unit 110, the output unit 120, the communication control IF unit 130, the storage unit 150 and the control unit 160.

The storage unit 150 is directed for storing therein data and programs necessary for various processings by the control unit 160. The storage unit 150, which is closely associated with the present invention, includes a text management table 150a, automaton data 150b, a stack 150c, an acceptance state management table 150d and a determination result table 150e.

The text management table 150a is directed for storing therein a plurality of texts to be searched. FIG. 5 is a diagram of one example of a data structure of the text management table 150a according to the first embodiment. As depicted in FIG. 5, the text management table 150a stores therein a text identification number and a text in an associated manner. For example, a text corresponding to the text identification number "1001" is "タンタン麺とロースとタンを頼んで、タンタン麺を食べた。" (tantanmen to rohsu to tan o tanonde tantanmen o tabeta).

The automaton data 150b is AC (Aho, Alfread V., Margaret J. Corasick) automaton (automaton based on Aho-Corasick method) data having nodes for accepting the search condition character string and nodes for accepting the out-of-search-condition character string.

Figures 6, 7, 8:
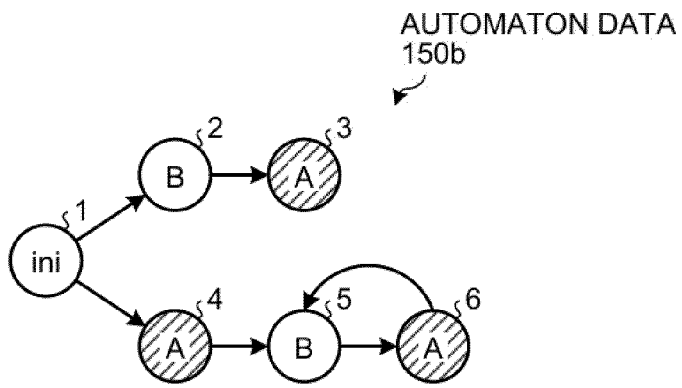
FIG. 6 is a diagram of one example of a data structure of automaton data according to the first embodiment.
FIG. 7 is a diagram of one example of a data structure of an acceptance state management table according to the first embodiment.
FIG. 8 is a diagram of one example of a data structure of a determination result table according to the first embodiment.

FIG. 6 is a diagram of one example of a data structure of the automaton data 150b according to the first embodiment. For convenient explanation, the automaton data 150b depicted in FIG. 6 is assumed to contain nodes for accepting the search condition character string "A" and nodes for accepting the out-of-search-condition character strings "BA" and "ABA" as one example.

Specifically, the automaton data 150b has nodes 1 to 6, where the node 1 is an initial node. The nodes for accepting the search condition character string "A" are the nodes 3, 4 and 6, the nodes for accepting the out-of-search-condition character string "BA" are the nodes 3 and 6, and the node for accepting the out-of-search-condition character string "ABA" is the node 6.

In FIG. 6, for simplified notation, a transition to the node 1 (ini) and a transition to a transition destination of the node 1 are omitted for description. When there is no transition of a corresponding character, the state returns to the node 1 or the transition destination of the corresponding character of the node 1. For example, when the current node is the node 4 and the character to be input next is one other than "B" and "A", the state changes to the node 1. When the current node is the node 4 and the character to be input next is "A", the state changes from the node 1 to the node 4 as the transition destination to A.

The search device 100 sequentially substitutes each character in the character string contained in the text into the automaton data 150b with the initial node (node 1) as a starting point, and can determine whether the character string hits the search condition character string or the out-of-search-condition character string depending on whether the state changes to the node for accepting the search condition character string or the node for accepting the out-of-search-condition character string.

The stack 150c is directed for storing therein correspondence (o) or non-correspondence (x). The number of stack frames of the stack 150c equals to the number obtained by adding one to the number of search condition character strings contained in the out-of-search-condition character string. When the character string in the text hits the search condition character string, the correspondence (o) is pushed to the stack 150c, and when the character string hits the out-of-search-condition character string, the correspondence (o) is changed into the non-correspondence (x) depending on a predetermined condition (see FIGS. 1 to 2).

The acceptance state management table 150d is directed for managing the processing contents when the state changes to the node for accepting the search condition character string or the node for accepting the out-of-search-condition character string in the automaton data 150b. FIG. 7 is a diagram of one example of a data structure of the acceptance state management table 150d according to the first embodiment.

As depicted in FIG. 7, the acceptance state management table 150d stores therein a node ID and a stack processing indication field with each other in an associated manner. The node ID is information for identifying each node of the automaton data 150b, and the node ID "1 to 6" corresponds to the respective nodes 1 to 6 in FIG. 6.

The processing indication field is information indicating the processing contents for the stack 150c when the state changes to each node. The first column in the processing indication field defines the number of times of pushing the correspondence (o) to the stack 150c. When the first column of the processing indication field is "1", the correspondence (o) is pushed to the stack 150c once. For example, when the character string in the text is input into the automaton (see FIG. 6) and the state changes to the node 3 (corresponding to the node ID "3"), the correspondence (o) is pushed to the stack 150c once. When the first column in the processing indication field is "0", the correspondence (o) is not pushed to the stack 150c.

The second column in the processing indication field defines the number of correspondences stored in the stack 150c which are changed into the non-correspondence (x). When the second column in the processing indication field is "−1", the last-pushed correspondence (o) among the correspondences (o) stored in the stack 150c is changed into the non-correspondence (x). For example, when the character string in the text is input into the automaton (see FIG. 6) and the state changes to the node 3, the last-pushed correspondence (o) is changed into the non-correspondence (x).

When a numerical value other than "0" is input into the first and second columns in the processing indication field like the node ID "3", after the correspondence (o) is pushed to the stack 150c according to the numerical value in the first column, the correspondence (o) is changed into the non-correspondence (x) according to the numerical value in the second column.

The determination result table 150e is directed for managing whether the character string hits the search condition character string except for the out-of-search-condition character string. FIG. 8 is a diagram of one example of a data structure of the determination result table 150e according to the first embodiment. As depicted in FIG. 8, the determination result table 150e stores therein the text identification number and the determination result with each other in an associated manner.

In the determination result table 150e, the text in which the determination result is "0" indicates that it does not hit the search condition character string, and the text in which the determination result is "1" indicates that it hits the search condition character string.

Returning to the explanation of FIG. 4, the control unit 160 has an internal memory for storing therein programs or control data which prescribe various processing procedures, and is directed for executing various processings using the same. The control unit 160, which is closely associated with the present invention, includes a search query analyzing unit 160a, an automaton generating unit 160b, a match processing unit 160c and a search result output unit 160d.

The search query analyzing unit 160a extracts the search condition character string and the out-of-search-condition character string contained in the search query when receiving the search query from the client terminal 50, and outputs the extracted search condition character string and out-of-search-condition character string to the automaton generating unit 160b.

The search query analyzing unit 160a sets the number of stack frames of the stack 150c on the basis of the search condition character string and the out-of-search-condition character string. Specifically, the search query analyzing unit 160a compares the search condition character string with the out-of-search-condition character string and determines the number obtained by adding 1 to the number of search condition character strings contained in the out-of-search-condition character string to create a determined number of stack frames in the stack 150c.

The search query analyzing unit 160a compares each out-of-search-condition character string with the search condition character string when a plurality of out-of-search-condition character strings are present, and determines the number of stack frames, respectively, to set the maximum number of stack frames among several types of number obtained from the determination result. The processing of setting the number of stack frames may be performed by the automaton generating unit 160b described later.

The automaton generating unit 160b generates automaton data (AC automaton) 150b having nodes for accepting the search condition character string and nodes for accepting the out-of-search-condition character string.

When the automaton generating unit 160b creates the automaton data 150b, the automaton data 150b (see FIG. 6) can be created on the basis of the Aho-Corasick method as a conventional method or the technical literature (Aho, Alfred V., Margaret J. Corasick (June, 1975). "Efficient string matching: An aid to bibliographic search". Communications of the ACM18(6): 333-340.DOI10.1145/360825.350855). The automaton data 150b depicted in FIG. 6 accepts the search condition character string "A" and the out-of-search-condition character strings "BA" and "ABA".

On the other hand, the automaton generating unit 160b creates the acceptance state management table 150d (see FIG. 7) on the basis of the automaton data 150b, the search condition character string and the out-of-search-condition character string. In the automaton data 150b depicted in FIG. 6, the nodes 3, 4 an 6 accept the search condition character string "A". Therefore, the automaton generating unit 160b sets "1" in the first column in the stack processing indication field corresponding to the node ID "3, 4, 6" in the acceptance state management table 150d.

Further, in the automaton data 150b, the node 3 accepts the out-of-search-condition character string "BA". Thus, the automaton generating unit 160b sets "−1" in the second column in the stack processing indication field corresponding to the node ID "3" in the acceptance state management table 150d (sets −1 since one search condition character string "A" is contained in the out-of-search-condition character string "BA").

In the automaton data 150b, the node 6 accepts the out-of-search-condition character strings "BA" and "ABA". Therefore, the automaton generating unit 160b sets "−2" in the second column in the stack processing indication field corresponding to the node ID "6" in the acceptance state management table 150d (sets −2 which is obtained by adding "−" to the larger number 2 since one search condition character string "A" is contained in the out-of-search-condition character string "BA" and two search condition character strings "A" are contained in the out-of-search-condition character string "ABA").

The match processing unit 160c extracts a text from the text management table 150a and sequentially inputs and matches the character strings in the extracted text into the automaton data 150b to determine whether the text is to be searched. The match processing unit 160c sets "1" in the determination result of the determination result table 150e when determining that the text is to be searched and sets "0" in the determination result of the determination result table 150e when determining that the text is not to be searched.

Specifically, the match processing unit 160c sequentially inputs the character strings in the text into the automaton data 150b to perform a transition to each node in the automaton data 150b, and compares the node at the transition destination with the acceptance state management table 150d to push the correspondence to the stack 150c or to change the pushed correspondence into the non-correspondence.

For example, when the character string in the text is input into the automaton (see FIG. 6) and the state changes to the node 3 (corresponding to the node ID "3"), since the first column in the stack processing indication field corresponding to the node ID "3" is set to "1", the match processing unit 160c pushes the correspondence (o) to the stack 150c once. Further, since the second column in the stack processing indication field corresponding to the node ID "3" is set to "−1", the match processing unit 160c changes the correspondence (o) last pushed to the stack 150c into the non-correspondence (x).

If any one correspondence is stored in the stack when all the character strings in the text are input into the automaton data 150b, the match processing unit 160c determines that the extracted text is to be searched. On the other hand, if no correspondence is stored in the stack when all the character strings in the text are input into the automaton data 150b, the match processing unit 160c determines that the extracted text is not to be searched.

Even when the character strings in the text are not all input into the automaton data 150b, if the correspondence is pushed to the stack area to be last pushed among the stack areas contained in the stack frame, the match processing unit 160c determines that the extracted text is to be searched.

The search result output unit 160d is directed for transmitting the text as a search result to the client terminal 50. Specifically, the search result output unit 160d refers to the determination result table 150e to extract the text having the text identification number in which the determination result is "1" from the text management table 150a, and outputs the extracted text to the client terminal 50.

A processing of the search device 100 will be explained below using a specific example. Here, for convenient explanation, the search condition character string is assumed as "A" and the out-of-search-condition character strings are assumed as "AABAABCX", "AABCAC" and "BAAB".

At first, the search query analyzing unit 160a compares the search condition character string "A" with the out-of-search-condition character strings "AABAABCX", "AABCAC" and "BAAB" and determines the number of search condition character strings contained in each out-of-search-condition character string. Then, the search query analyzing unit 160a sets as many stack frames as the maximum number of each number plus one in the stack 150c.

Since four search condition character strings "A" are contained in the out-of-search-condition character string "AABAABCX", three search condition character strings "A" are contained in the out-of-search-condition character string "AABCAC", and two search condition character strings "A" are contained in the out-of-search-condition character string "BAAB", as many stack frame as the number "5" obtained by adding one to the maximum number "4" is set in the stack 150c.

Figure 9:
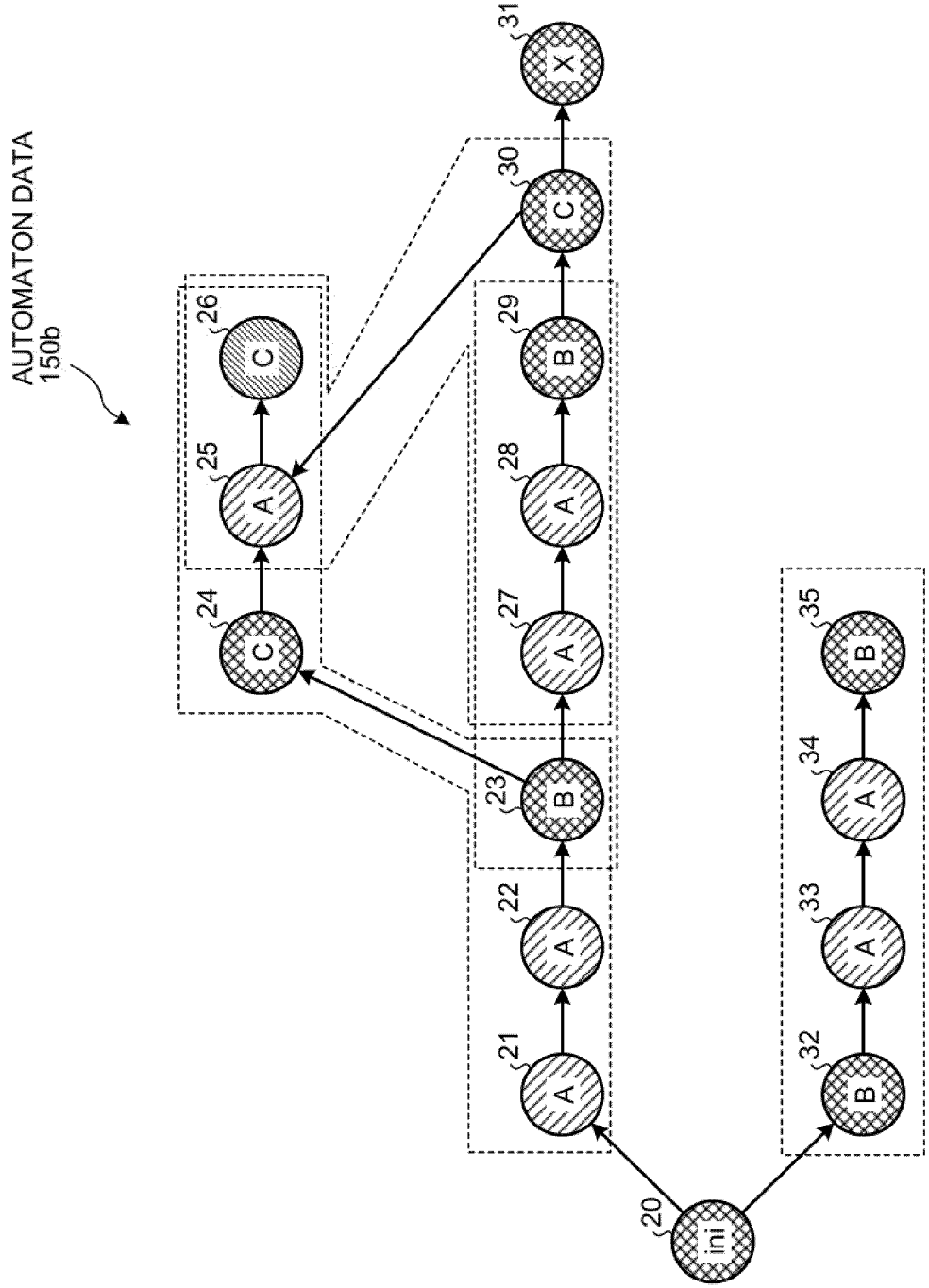
FIG. 9 is a diagram of the automaton data for accepting A, AABAABCX, AABCAC and BAAB.
Figure 11:
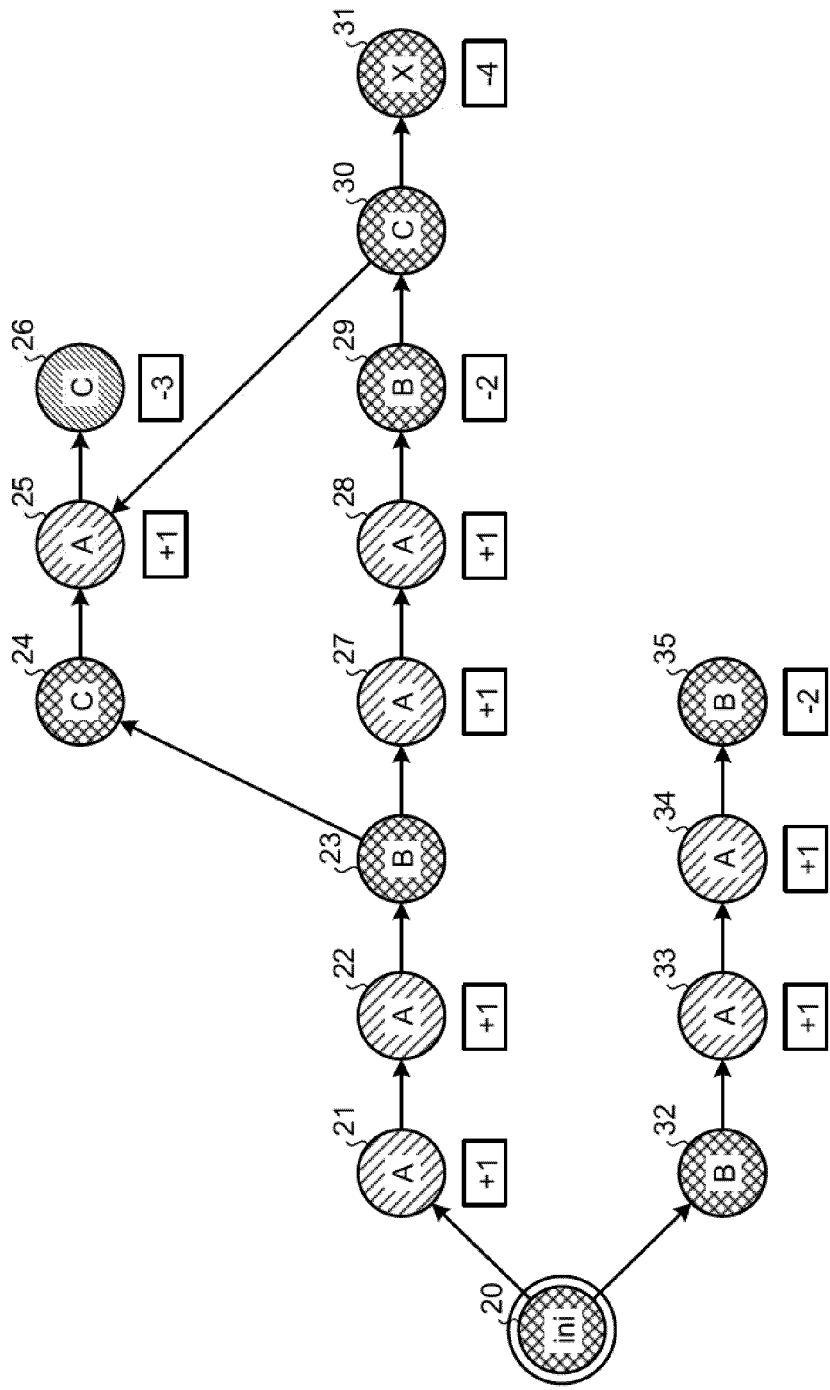
FIG. 11 is a diagram of a match processing of a text "AABAABCAC"
Figure 12:
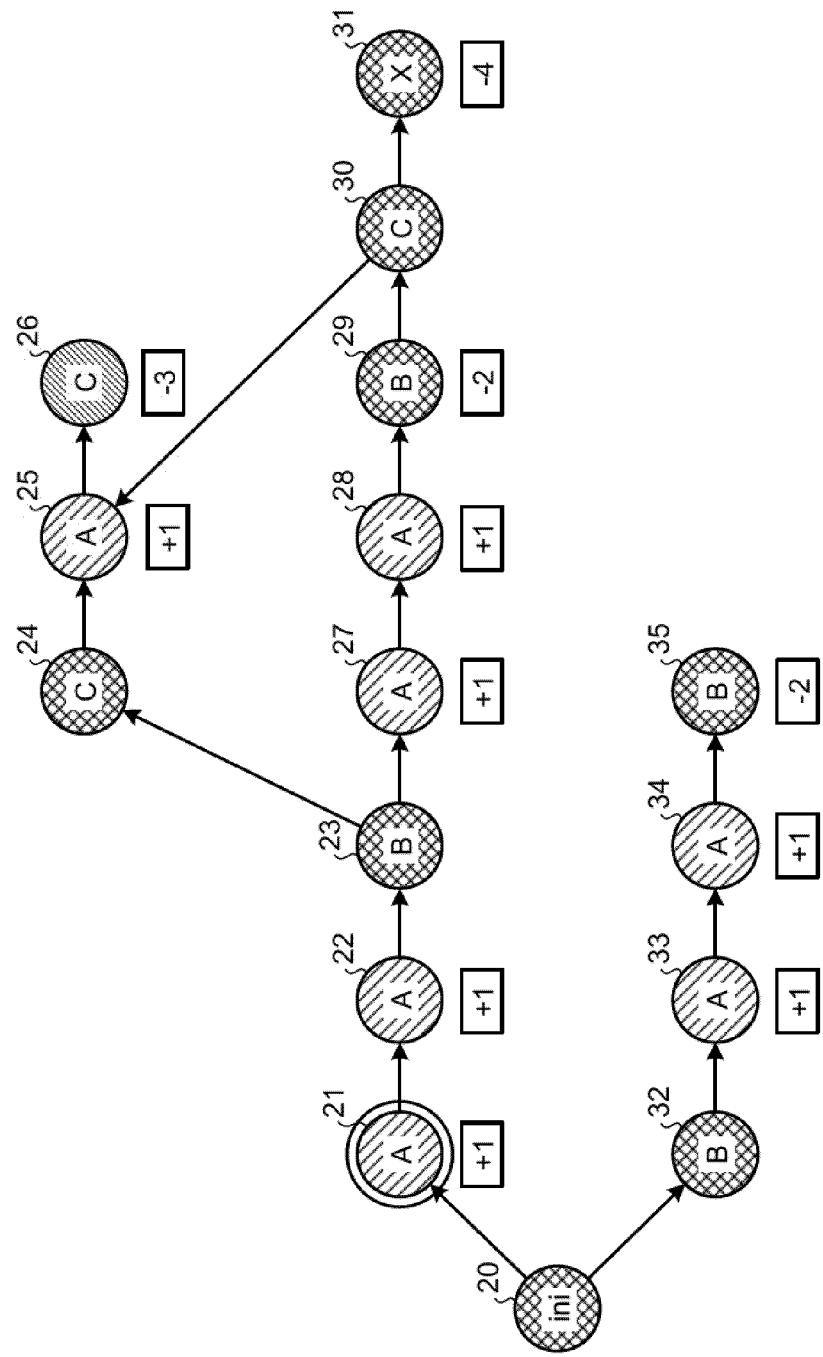
FIG. 12 is a diagram of the match processing of the text "AABAABCAC"
Figure 13:
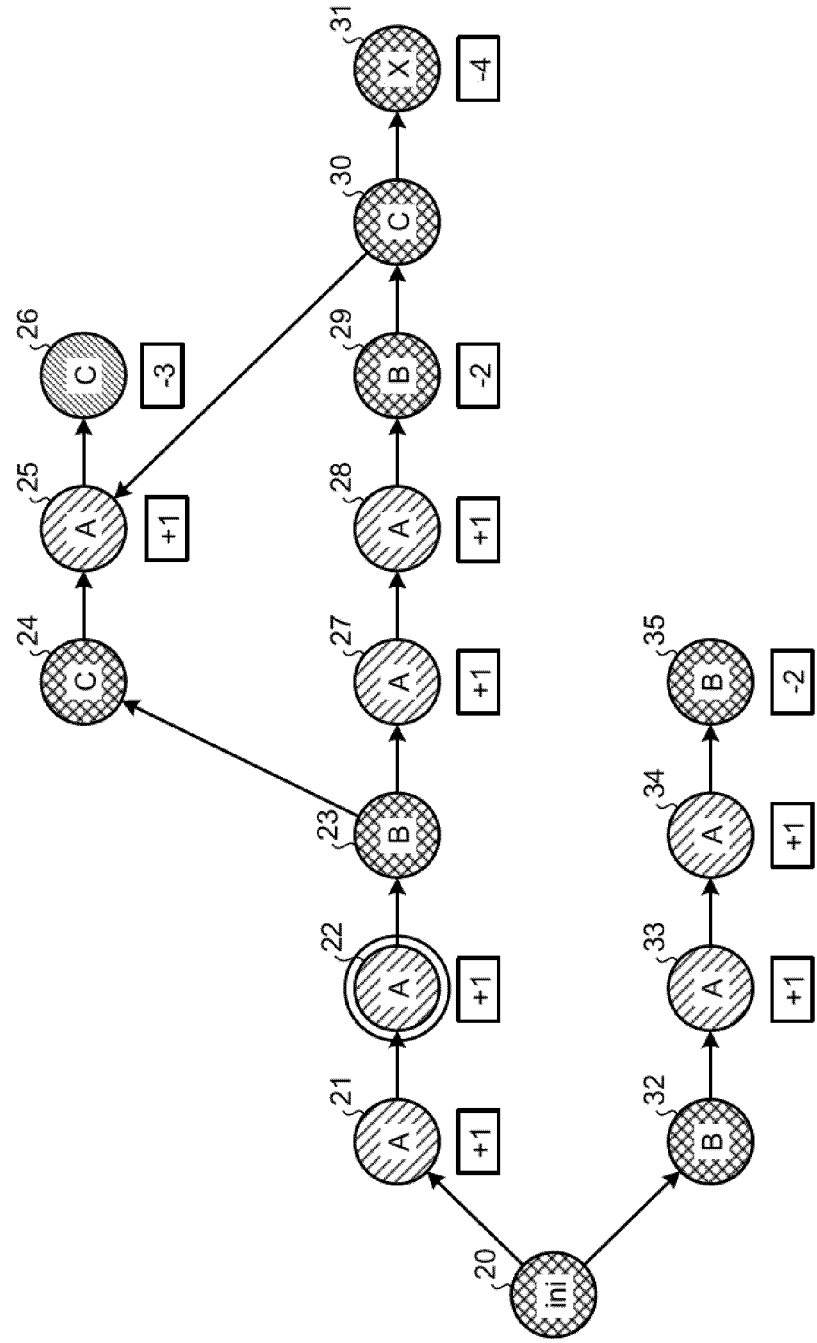
FIG. 13 is a diagram of the match processing of the text "AABAABCAC"

Subsequently, the automaton generating unit 160b creates the automaton data (AC automaton) 150b having nodes for accepting the search condition character "A" and nodes for accepting the out-of-search-condition character strings "AABAABCX", "AABCAC" and "BAAB". FIG. 9 is a diagram of the automaton data for accepting A, AABAABCX, AABCAC and BAAB.

The automaton data 150b depicted in FIG. 9 has nodes 20 to 35, where the node 20 is an initial node. The nodes for accepting the search condition character string "A" are nodes 21, 22, 25, 27, 28, 33 and 34. The node for accepting the out-of-search-condition character string "AABAABCX" is the node 31. The node for accepting the out-of-search-condition character string "AABCAC" is the node 26. The nodes for accepting the out-of-search-condition character string "BAAB" are the nodes 29 and 35.

In FIG. 9, a transition to the node 1 (ini) and a transition to the transition destination of the node 1 are omitted for simplified notation. When there is no transition of the corresponding character, the state returns to the node 1 or the transition destination of the corresponding character of the node 1. For example, when "B" is input at the node 35, the state changes from the node 20 (ini) to the node 32 as the transition destination to B, and when "C" is input at the node 35, the state changes to the node 20.

Subsequently, the automaton generating unit 160b creates the acceptance state management table 150d on the basis of the automaton data 150b (see FIG. 9), the search condition character string "A" and the out-of-search-condition character strings "AABAABCX", "AABCAC" and "BAAB". In the automaton data 150b depicted in FIG. 9, the nodes 21, 22, 25, 26, 27, 28, 33 and 34 accept the search condition character string "A". Therefore, the automaton generating unit 160b sets "1" in the first column in the stack processing indication field corresponding to the node ID "21, 22, 25, 26, 27, 28, 33, 34" in the acceptance state management table 150d.

In the automaton data 150b (see FIG. 9), the node 31 accepts the out-of-search-condition character string "AABAABCX". Thus, the automaton generating unit 160b sets "−4" in the second column in the stack processing indication field corresponding to the node ID "31" in the acceptance state management table 150d (sets −4 since four search condition character strings "A" are contained in the out-of-search-condition character string "AABAABCX").

In the automaton data 150b (see FIG. 9), the node 26 accepts the out-of-search-condition character string "AABCAC". Thus, the automaton generating unit 160b sets "−3" in the second column in the stack processing indication field corresponding to the node ID "26" in the acceptance state management table 150d (sets −3 since three search condition character strings "A" are contained in the out-of-search-condition character strings "AABCAC").

In the automaton data 150b (see FIG. 9), the nodes 29 and 35 accept the out-of-search-condition character string "BAAB". Thus, the automaton generating unit 160b sets "−2" in the second column in the stack processing indication field corresponding to the node ID "29, 35" in the acceptance state management table 150d (sets −2 since two search condition character strings "A" are contained in the out-of-search-condition character string "BAAB"). FIG. 10 is a diagram of one example of the acceptance state management table 150d corresponding to the automaton data 150b depicted in FIG. 9.

Figure 20:
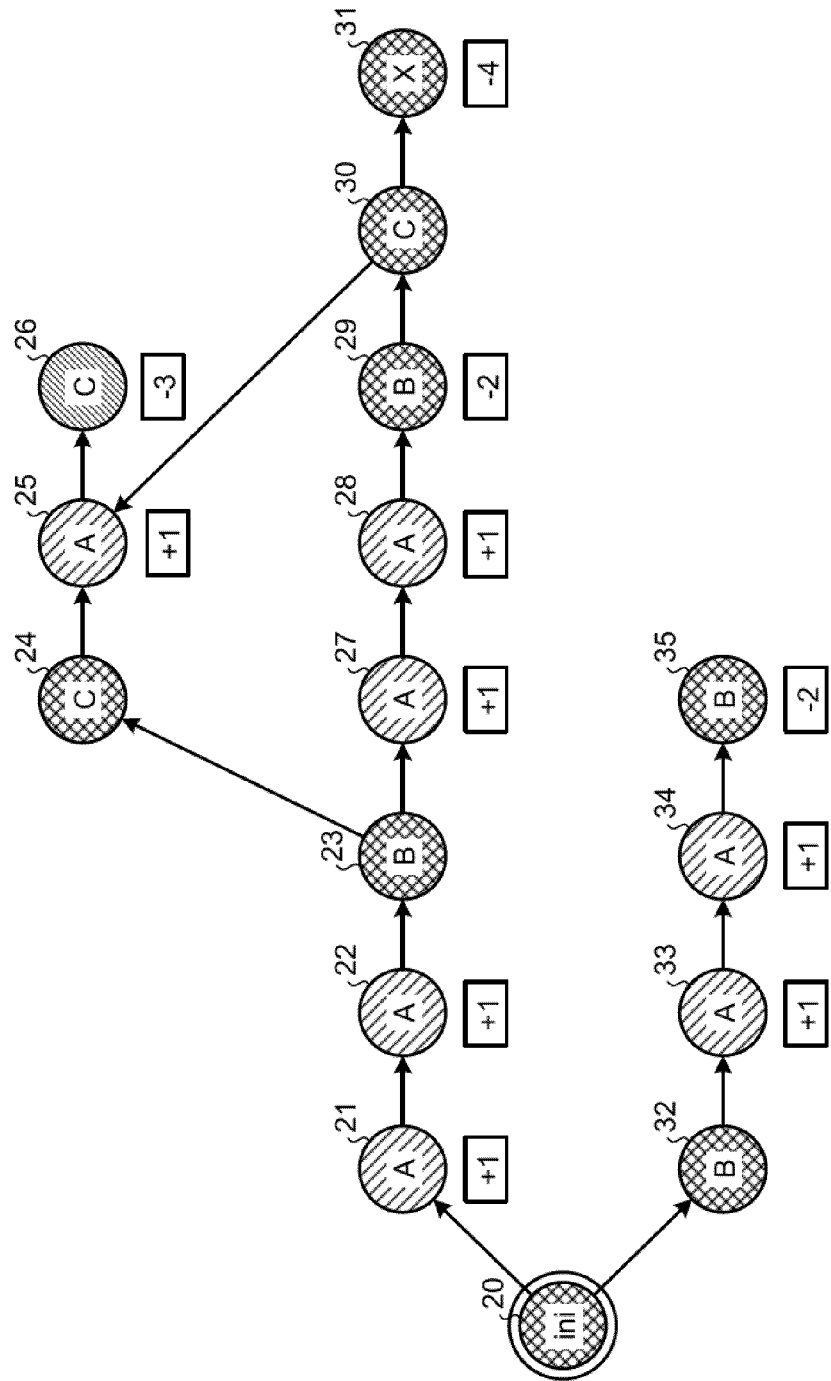
FIG. 20 is a diagram of a match processing of a text "AB"
Figure 21:
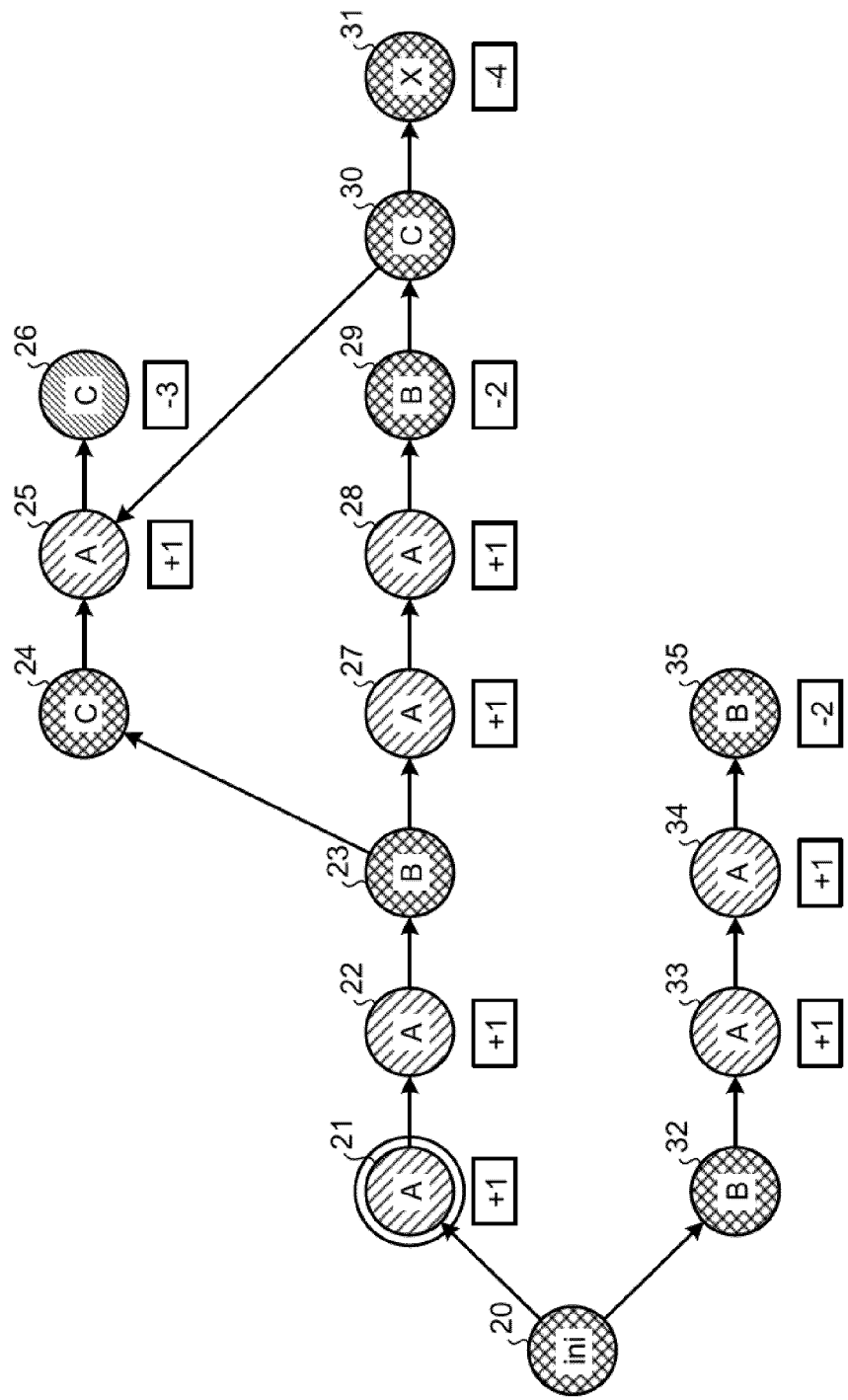
FIG. 21 is a diagram of the match processing of the text "AB"
Figure 22:
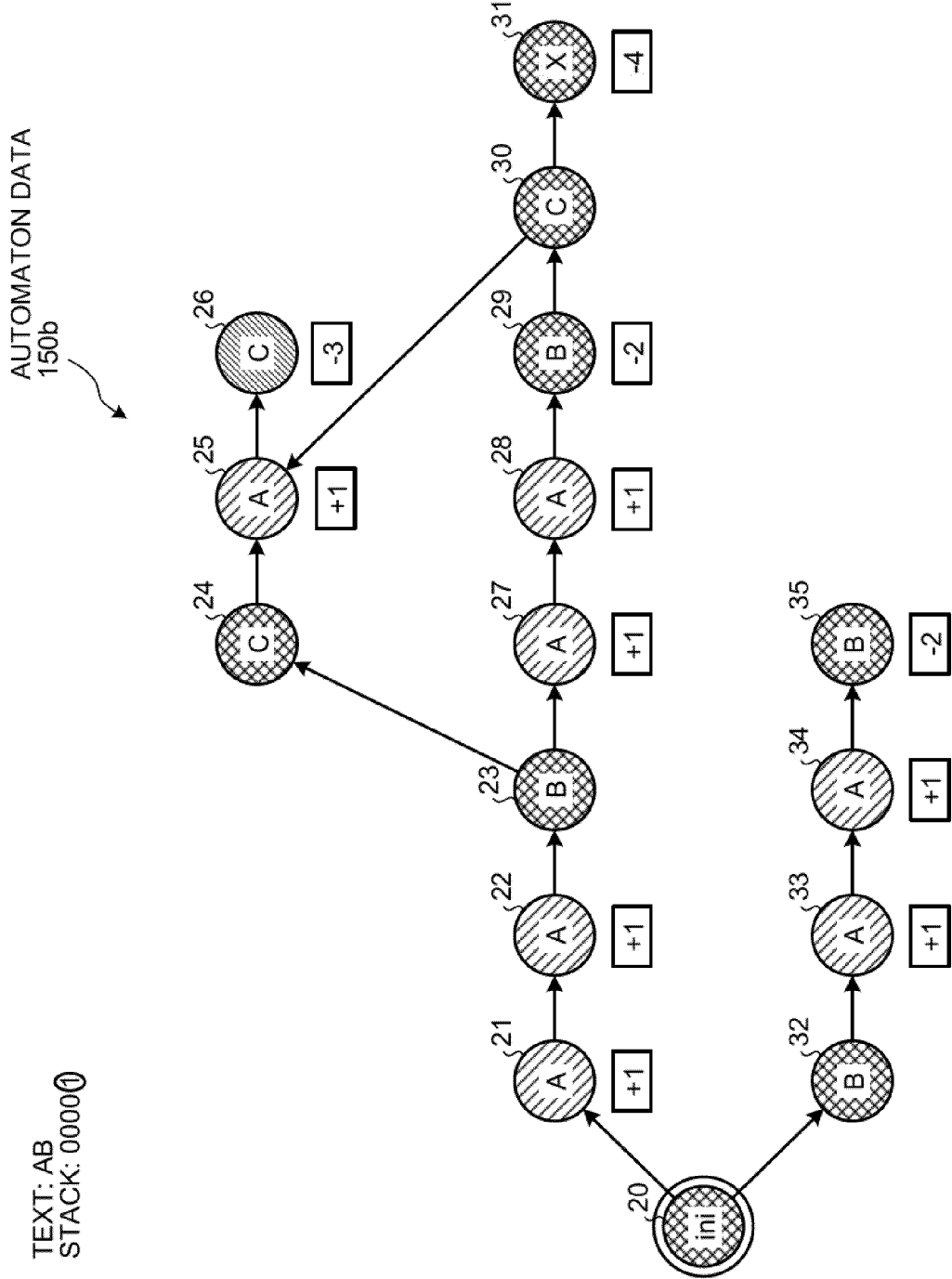
FIG. 22 is a diagram of the match processing of the text "AB"

Subsequently, the match processing unit 160c sequentially inputs and matches the character strings in the text into the automaton data 150b, and determines whether the text is to be searched. At first, there will be explained a processing in which the match processing unit 160c inputs the text "AABAABCAC" into the automaton data 150b (see FIG. 9) and determines whether the text is to be searched. FIGS. 11 to 19 are diagrams of the match processing of the text "AABAABCAC", FIG. 20 to 22 are diagrams of the match processing of the text "AB", and FIGS. 23 to 27 are diagrams of the match processing of the text "BAAB". For convenient explanation, the correspondence pushed to the stack is assumed as "1" and the non-correspondence is assumed as "0".

When the match processing unit 160c sets the starting point at the node 20 as the initial node of the automaton data 150b (see FIG. 11) and inputs "A" as the first character of the text into the automaton data 150b, the state changes from the node 20 to the node 21. Since the node 21 accepts the search condition character string "A" (since the first column in the stack processing indication field corresponding to the node ID "21" is 1 in the acceptance state management table 150d (FIG. 10)), the correspondence (1) is pushed to the stack (see FIG. 12).

When the match processing unit 160c inputs "A" as the second character of the text into the automaton data 150b, the state changes from the node 21 to the node 22. Since the node 22 accepts the search condition character string "A" (since the first column in the stack processing indication field corresponding to the node ID "22" is 1 in the acceptance state management table 150d (FIG. 10)), the correspondence (1) is pushed to the stack (see FIG. 13).

Figure 14:
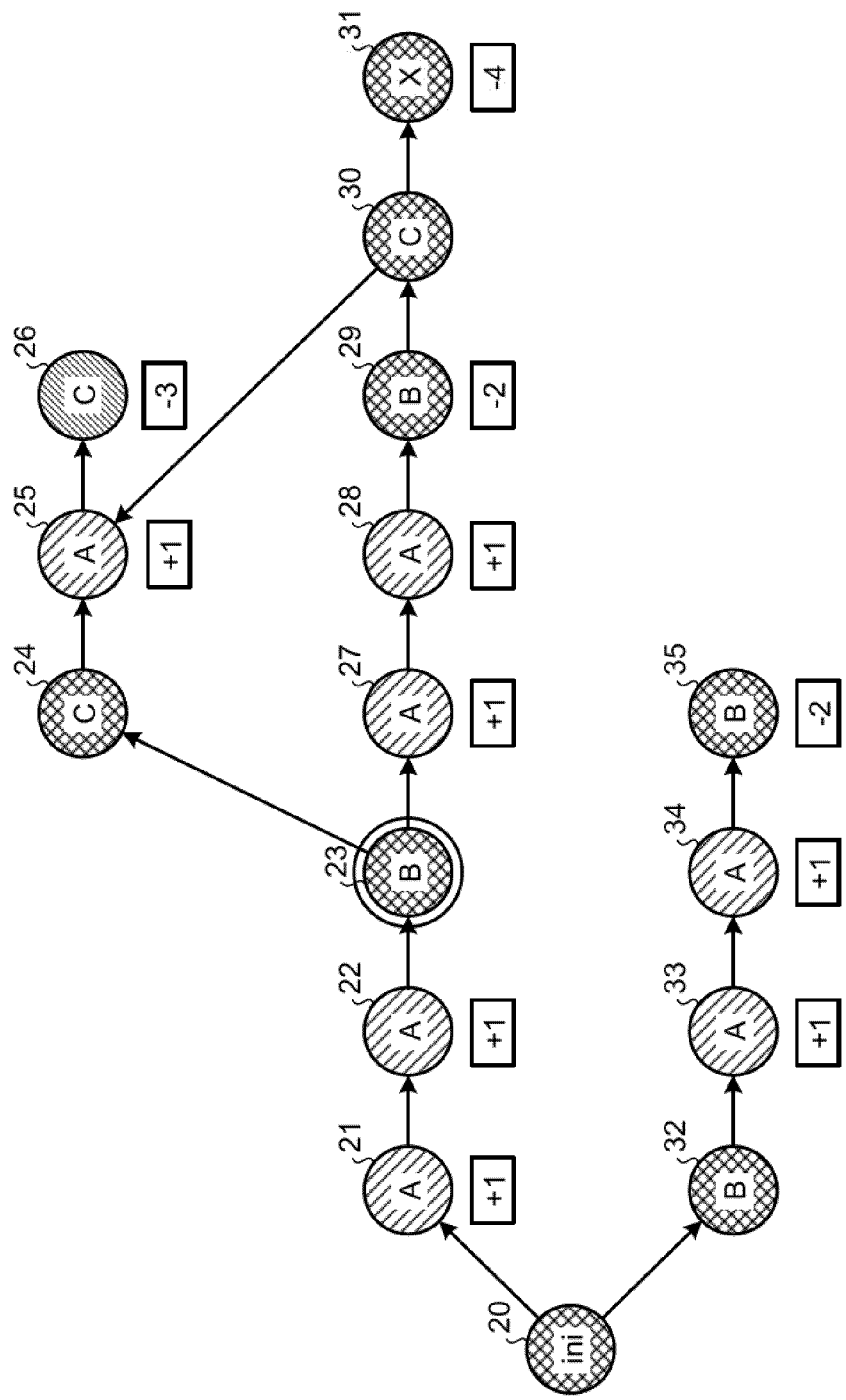
FIG. 14 is a diagram of the match processing of the text "AABAABCAC"
Figure 15:
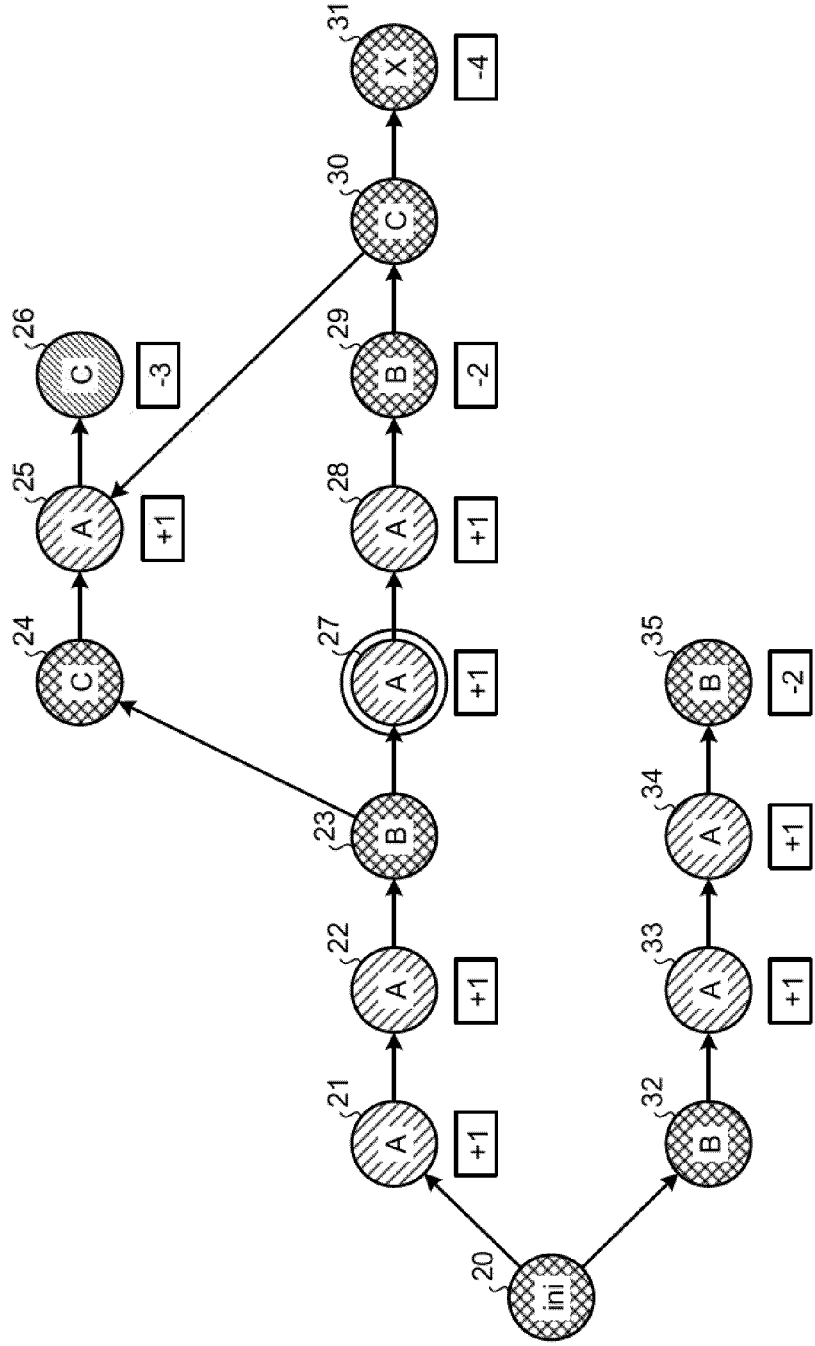
FIG. 15 is a diagram of the match processing of the text "AABAABCAC"
Figure 16:
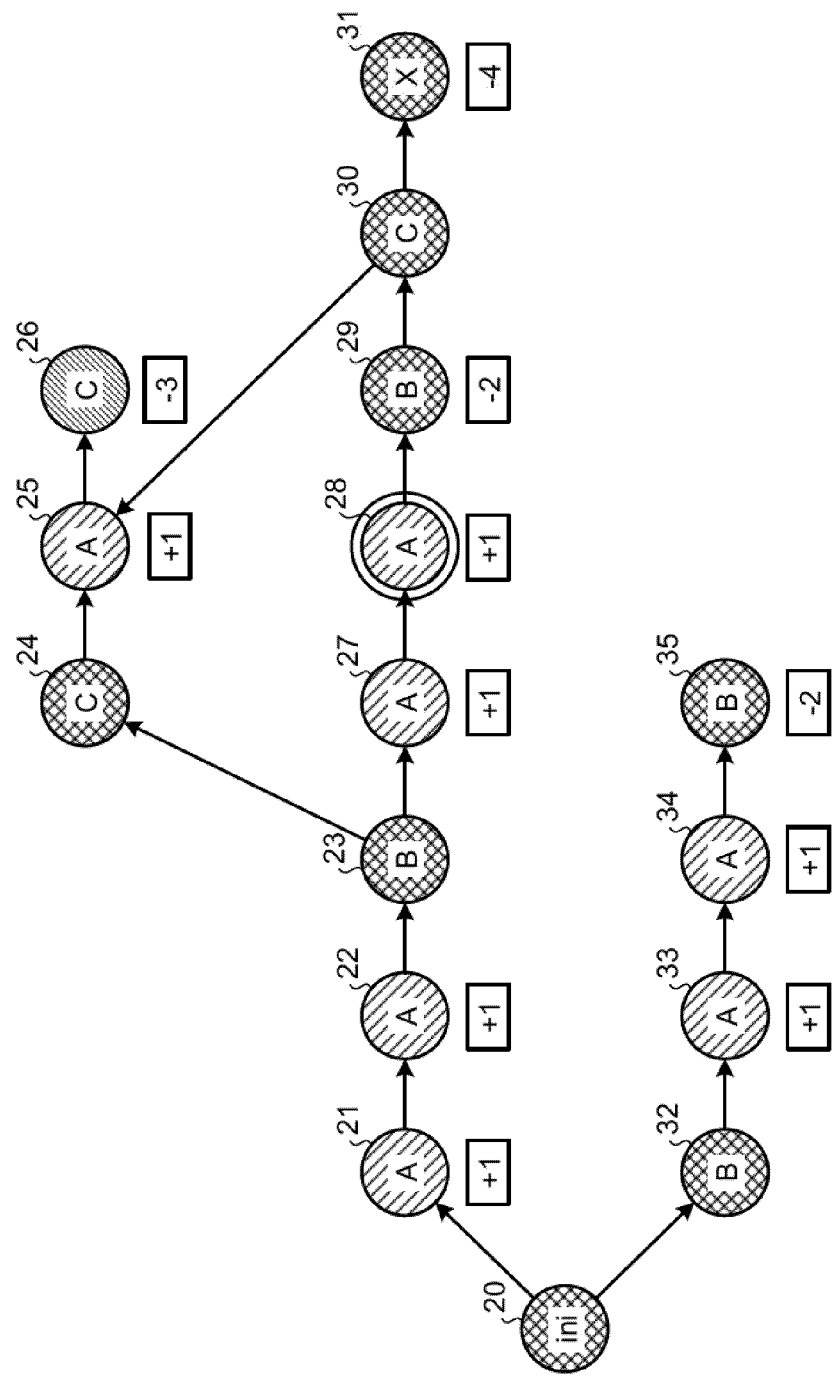
FIG. 16 is a diagram of the match processing of the text "AABAABCAC"
Figure 17:
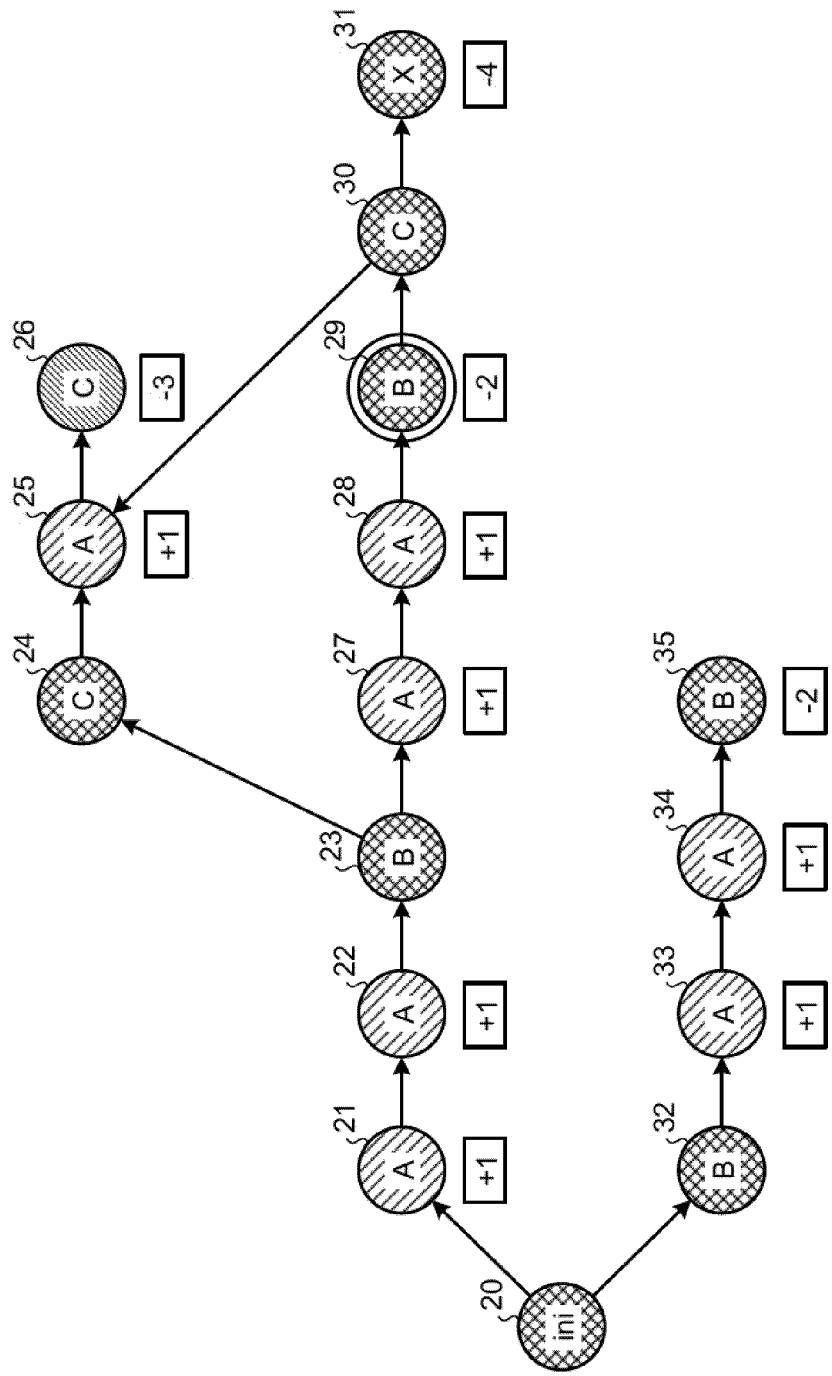
FIG. 17 is a diagram of the match processing of the text "AABAABCAC"

When the match processing unit 160c inputs the third character "B" of the text into the automaton data 150b, the state changes from the node 22 to the node 23 (see FIG. 14). When the fourth character "A" in the text is input, the state changes from the node 23 to the node 27. Since the node 27 accepts the search condition character string "A" (since the first column in the stack processing indication field corresponding to the node ID "27" is 1 in the acceptance state management table 150d (FIG. 10)), the correspondence (1) is pushed to the stack (see FIG. 15).

When the match processing unit 160c inputs the fifth character "A" of the text into the automaton data 150b, the state changes from the node 27 to the node 28. Since the node 28 accepts the search condition character string "A" (since the first column in the stack processing indication field corresponding to the node ID "27" is 1 in the acceptance state management table 150d (FIG. 10)), the correspondence (1) is pushed to the stack (see FIG. 16).

When the match processing unit 160c inputs the sixth character "B" of the text into the automaton data 150b, the state changes from the node 28 to the node 29. Since the node 29 accepts the out-of-search-condition character string "BAAB" (since the second column in the stack processing indication field corresponding to the node ID "29" is −2 in the acceptance state management table 150d (FIG. 10)), the correspondence (1) last pushed to the stack and the previous correspondence (1) are changed into the non-correspondence (0) (see FIG. 17).

Figure 18:
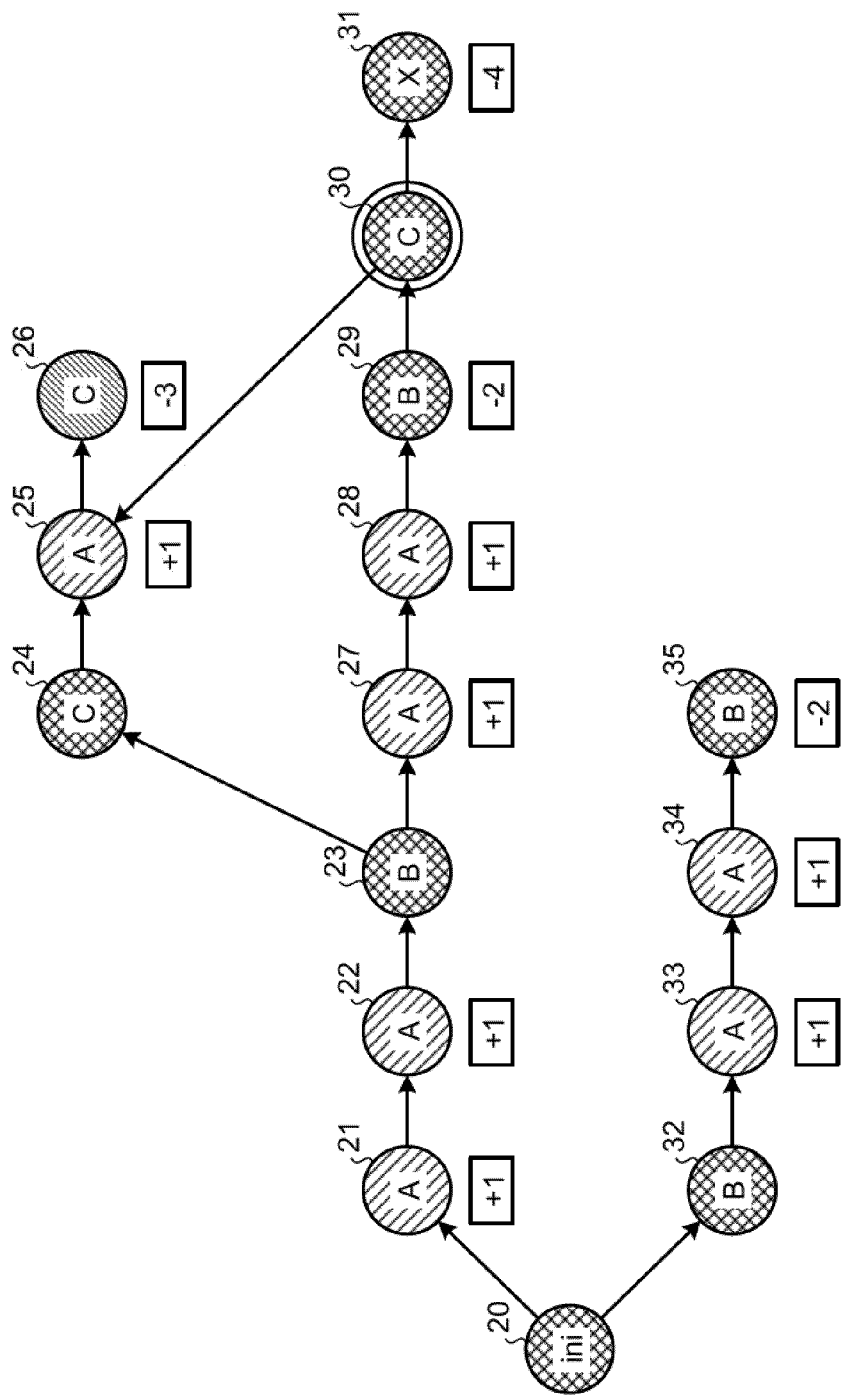
FIG. 18 is a diagram of the match processing of the text "AABAABCAC"
Figure 19:
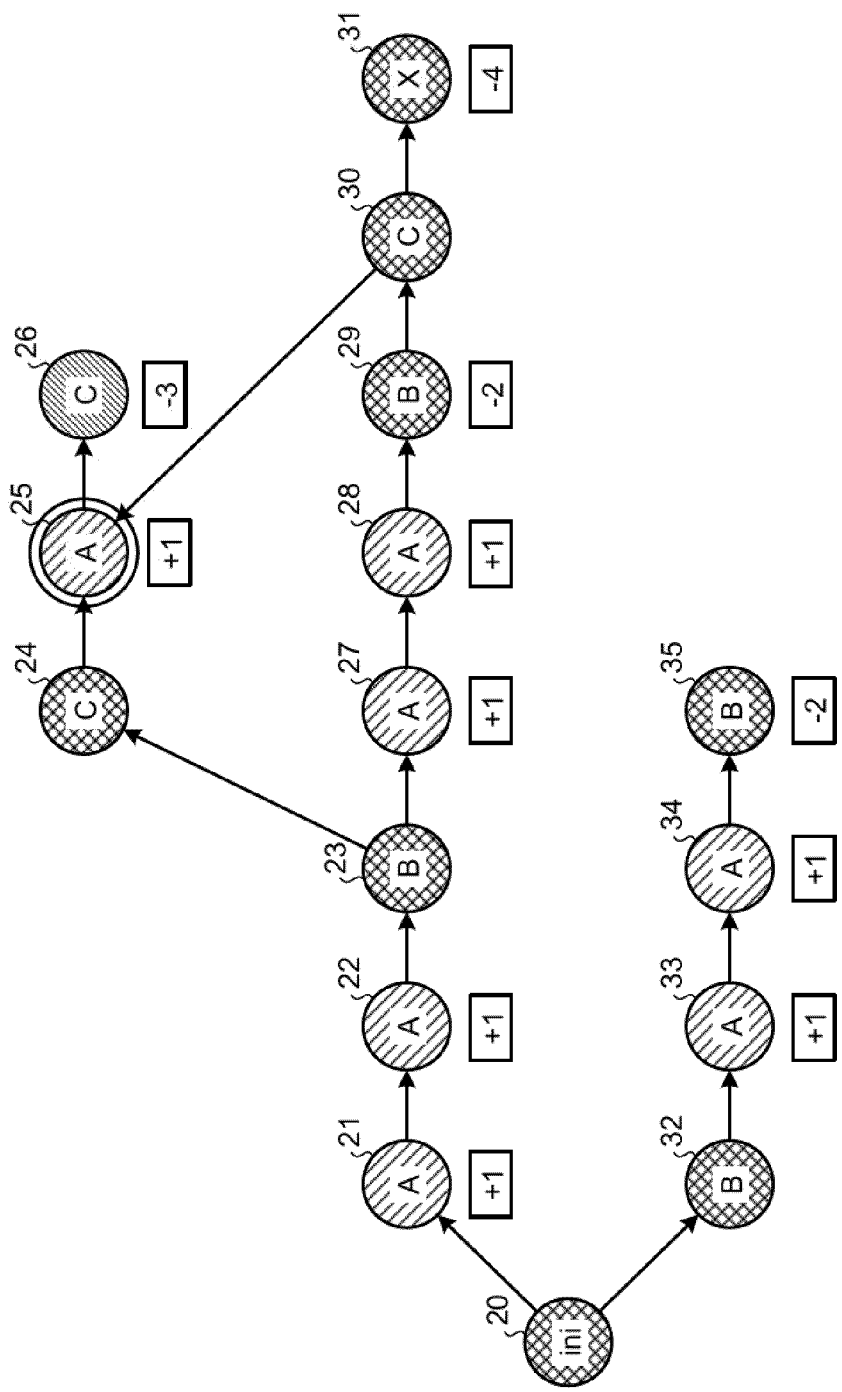
FIG. 19 is a diagram of the match processing of the text "AABAABCAC"

When the match processing unit 160c inputs the seventh character "C" of the text into the automaton data 150b, the state changes from the node 29 to the node 30 (see FIG. 18).

When the eighth character "A" of the text is input, the state changes from the node 30 to the node 25. Since the node 25 accepts the search condition character string "A" (since the first column in the stack processing indication field corresponding to the node ID "25" is 1 in the acceptance state management table 150d (FIG. 10)), the correspondence (1) is pushed to the stack (see FIG. 19).

Since the correspondence (1) is pushed to the stack area (position) to be last pushed among the stack areas contained in the stack frame, the match processing unit 160c determines that the text "AABAABCAC" is to be searched. The match processing unit 160c sets the determination result corresponding to the text "AABAABCAC" at "1" in the determination result table 150e.

Now proceeding to the explanation of FIG. 20, at first, when the match processing unit 160c sets the starting point at the node 20 as the initial node of the automaton data 150b (see FIG. 20) and inputs the first character "A" of the text into the automaton data 150b, the state changes from the node 20 to the node 21. Since the node 21 accepts the search condition character string "A" (since the first column in the stack processing indication field corresponding to the node ID "21" is 1 in the acceptance state management table 150d (FIG. 10)), the correspondence (1) is pushed to the stack (see FIG. 21).

When the match processing unit 160c inputs the second character "B" of the text into the automaton data 150b, the state changes from the node 21 to the node 20 (see FIG. 22). Since the correspondence (1) is stored in the stack when all the character string "AB" in the text is input into the automaton data 150b, the match processing unit 160c determines that the text "AB" is to be searched.

Figure 23:
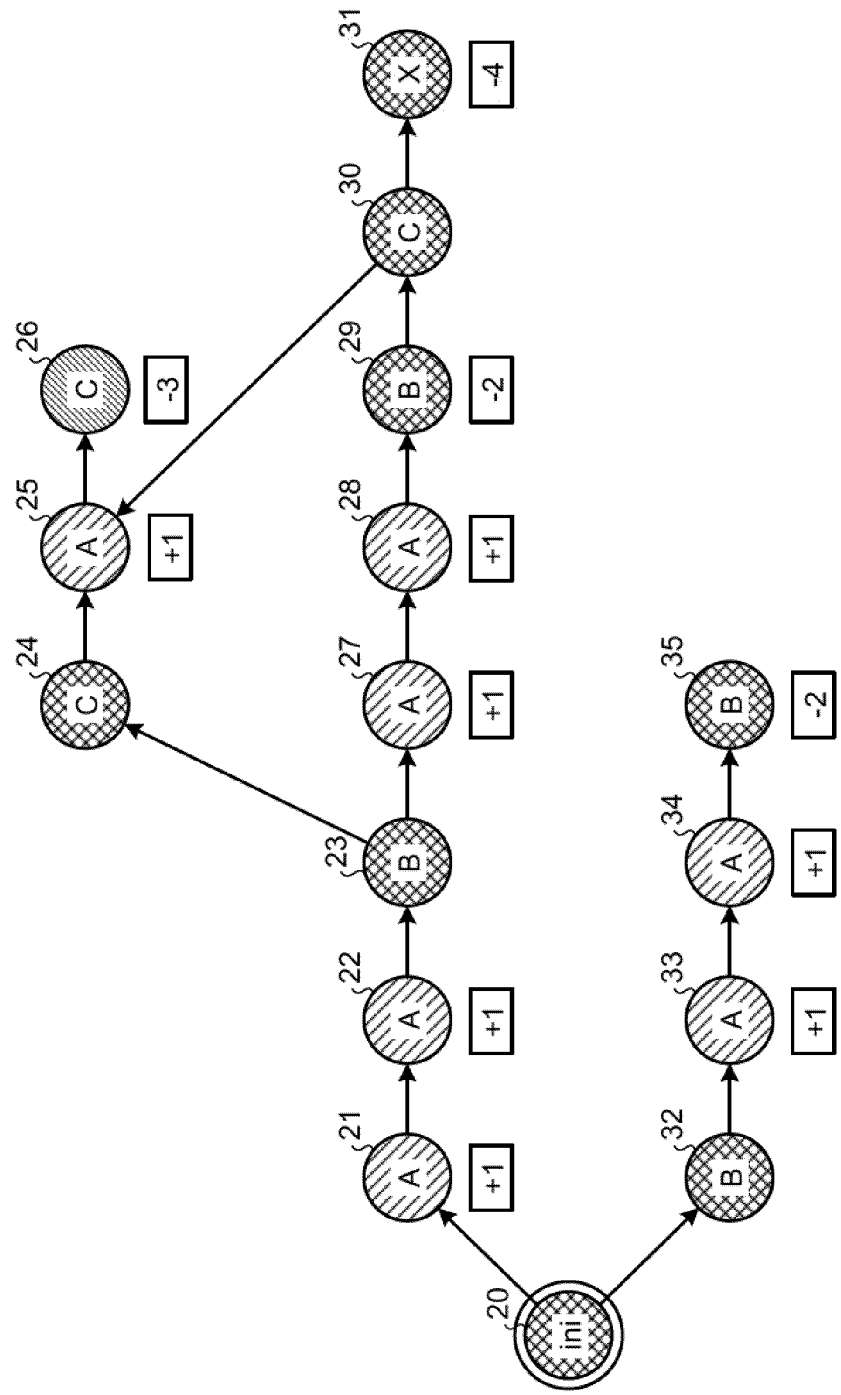
FIG. 23 is a diagram of a match processing of a text "BAAB"
Figure 24:
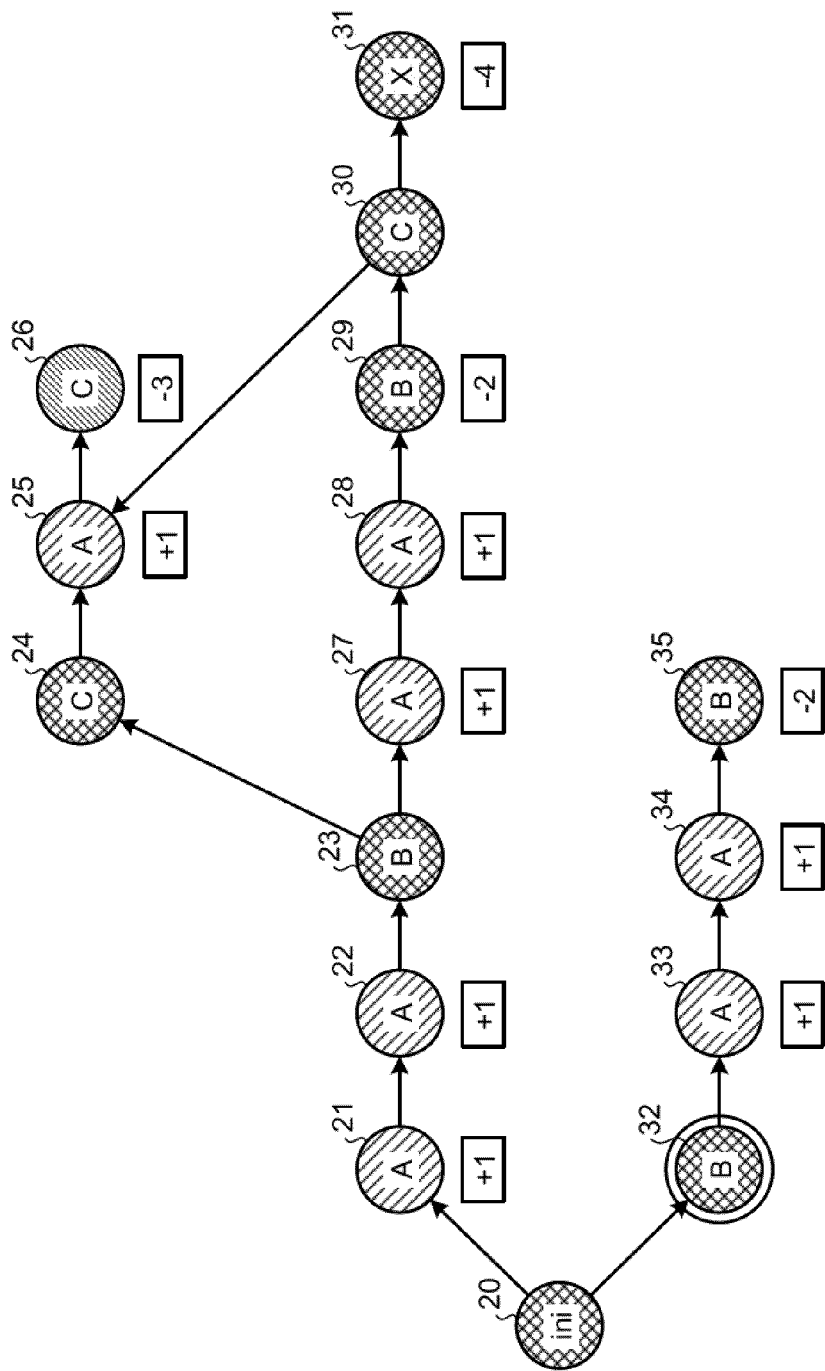
FIG. 24 is a diagram of the match processing of the text "BAAB"
Figure 25:
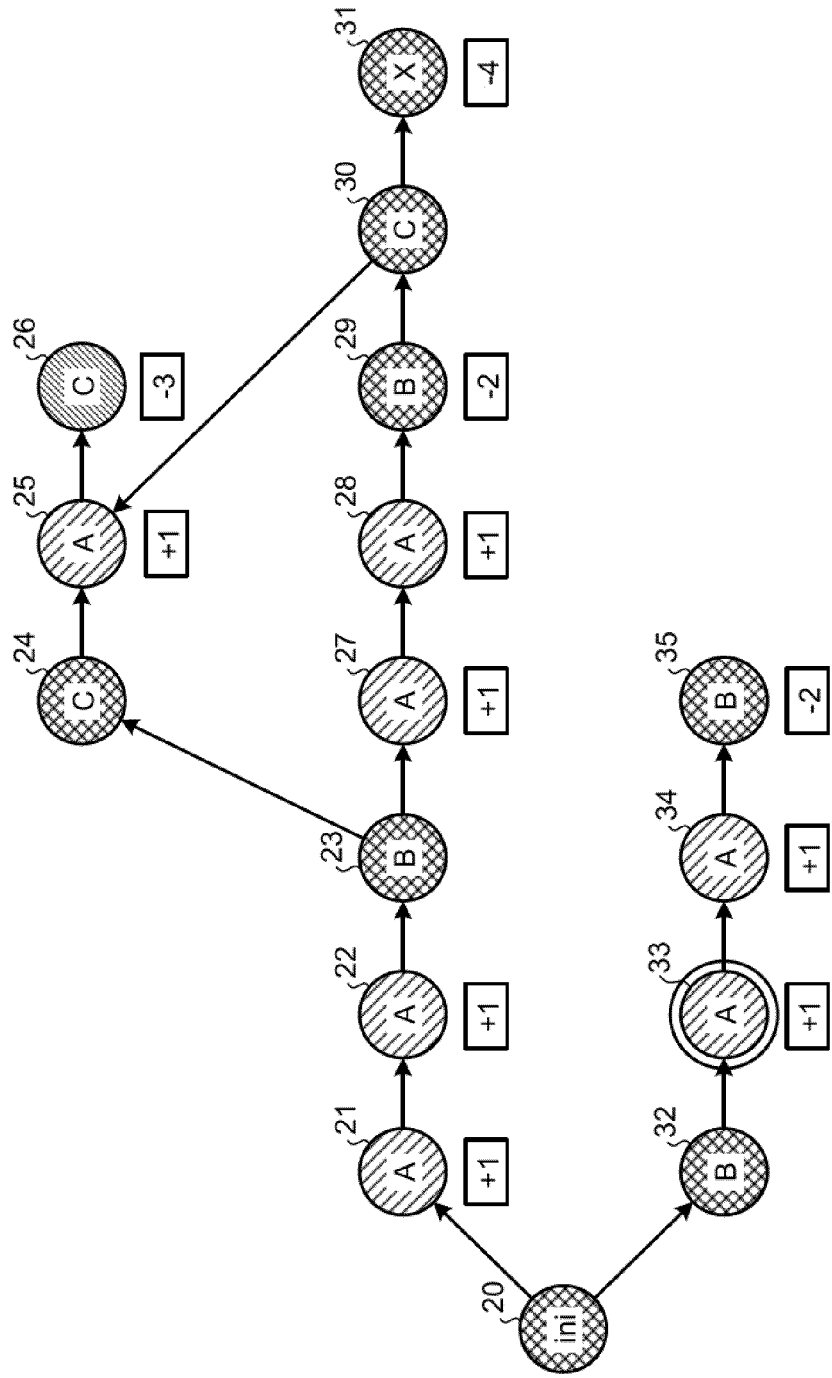
FIG. 25 is a diagram of the match processing of the text "BAAB"
Figure 26:
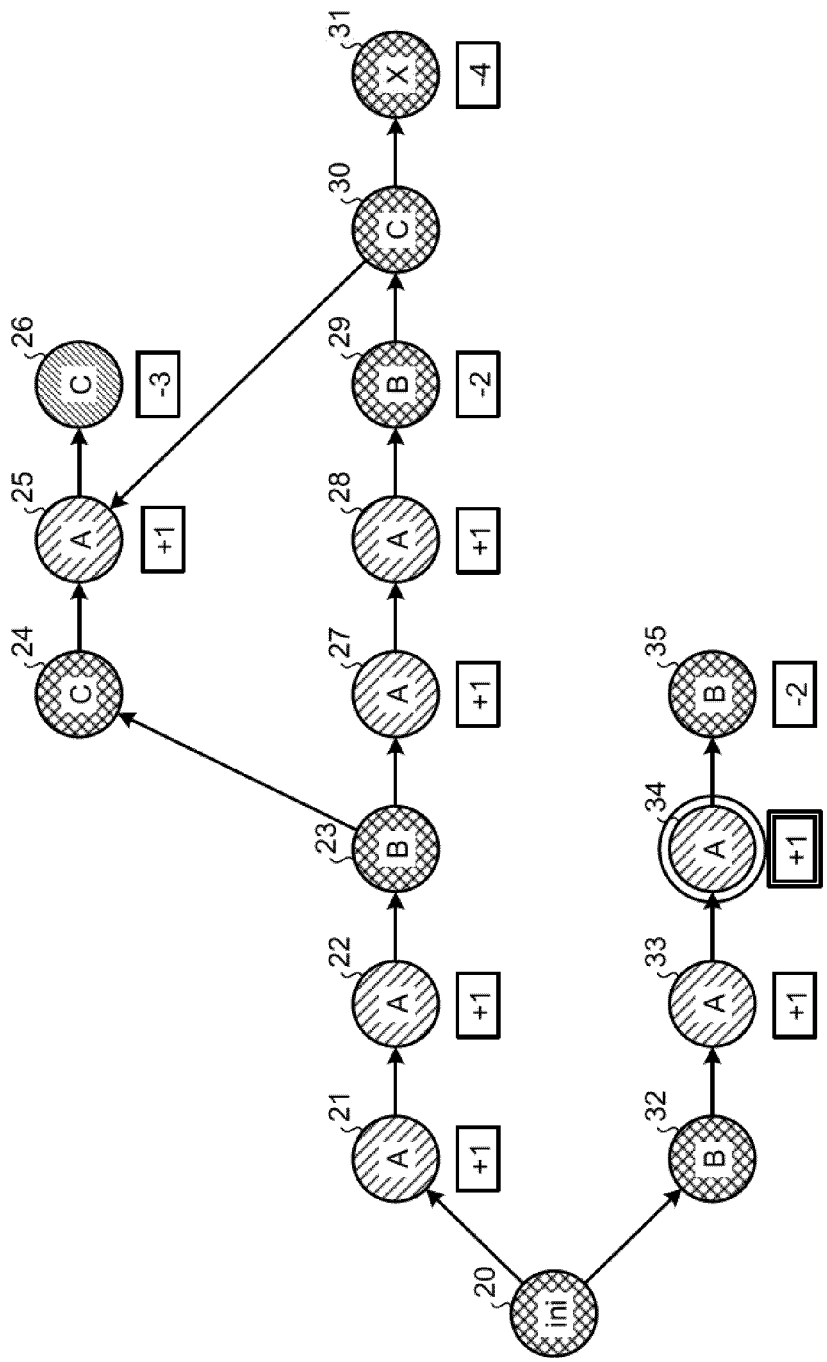
FIG. 26 is a diagram of the match processing of the text "BAAB"
Figure 27:
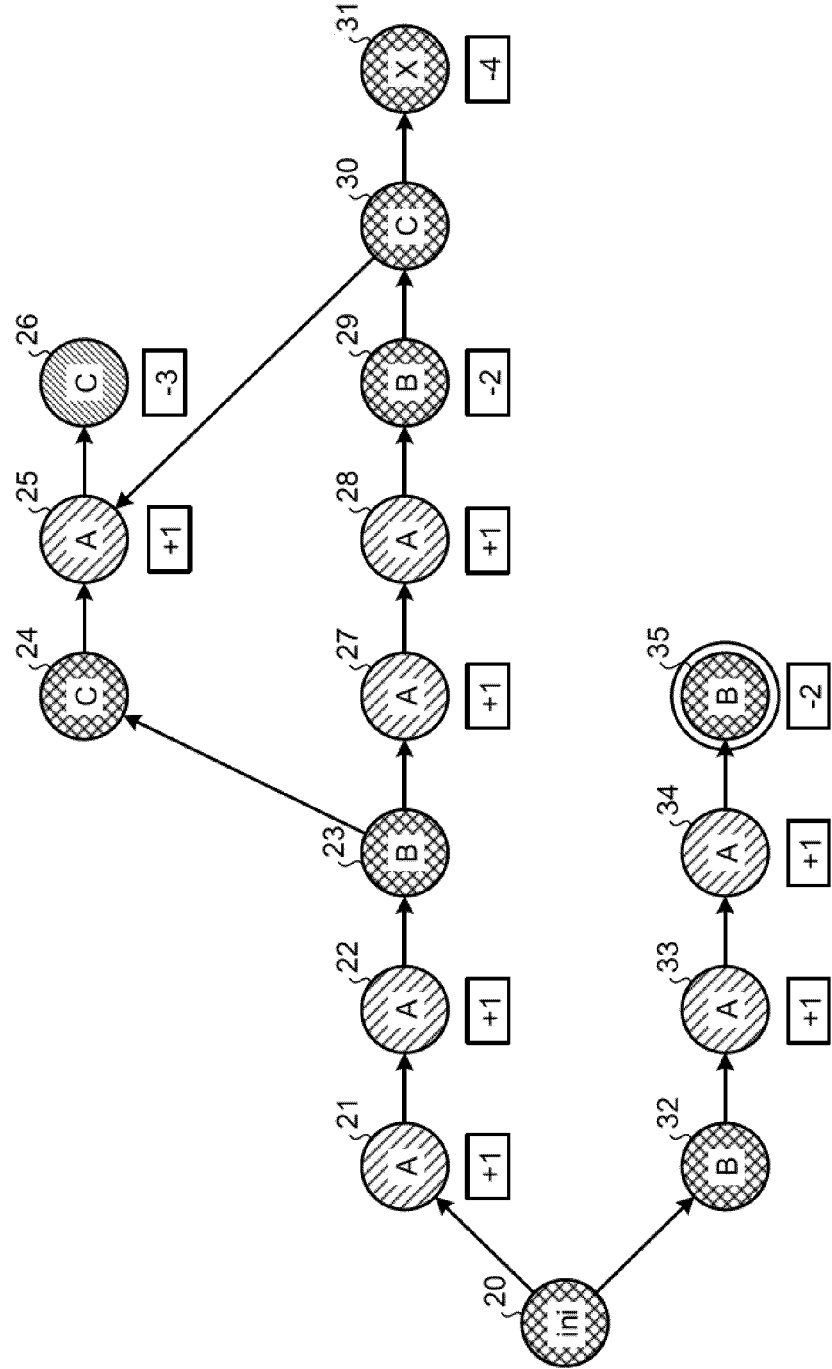
FIG. 27 is a diagram of the match processing of the text "BAAB"

Now proceeding to the explanation of FIG. 23, at first, when the match processing unit 160c sets the starting point at the node 20 as the initial node of the automaton data 150b (see FIG. 23) and inputs the first character "B" of the text into the automaton data 150b, the state changes from the node 20 to the node 32 (see FIG. 24).

When the match processing unit 160c inputs the second character "A" of the text into the automaton data 150b, the state changes from the node 32 to the node 33. Since the node 33 accepts the search condition character string "A" (since the first column in the stack processing indication field corresponding to the node ID "33" is 1 in the acceptance state management table 150d (FIG. 10)), the correspondence (1) is pushed to the stack (see FIG. 25).

When the match processing unit 160c inputs the third character "A" of the text into the automaton data 150b, the state changes from the node 33 to the node 34. Since the node 34 accepts the search condition character string "A" (since the first column in the stack processing indication field corresponding to the node ID "34" is 1 in the acceptance state management table 150d (FIG. 10)), the correspondence (1) is pushed to the stack (see FIG. 26).

When the match processing unit 160c inputs the fourth character "B" of the text into the automaton data 150b, the character string transits from the node 34 to the node 35. Since the node 35 accepts the out-of-search-condition character string "BAAB" (since the second column in the stack processing indication field corresponding to the node ID "34" is −2 in the acceptance state management table 150d (FIG. 10)), the correspondence (1) last pushed to the stack and the previous correspondence (1) are changed into the non-correspondence (0) (see FIG. 27).

Since no correspondence (1) is stored in the stack when all the character string "BAAB" in the text is input into the automaton data 150b, the match processing unit 160c determines that the text "BAAB" is not to be searched.

Figure 28:
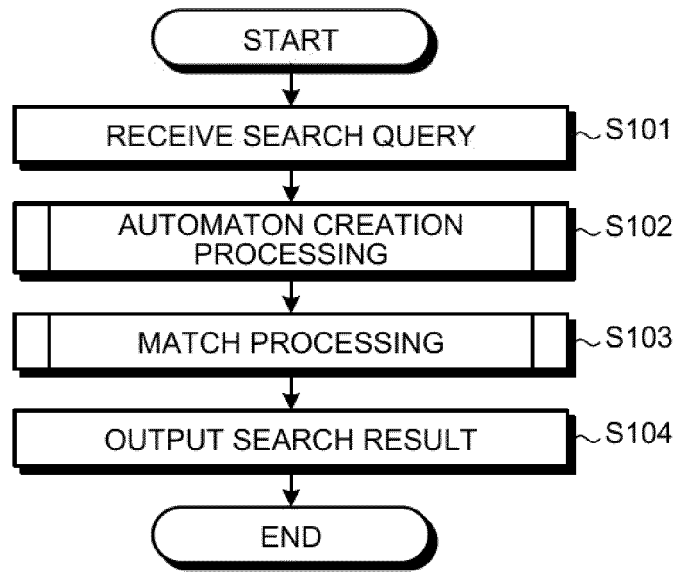
FIG. 28 is a flowchart of a processing procedure of the search device according to the first embodiment.

A processing procedure of the search device 100 according to the first embodiment will be explained below. FIG. 28 is a flowchart of the processing procedure of the search device 100 according to the first embodiment. As depicted in FIG. 28, in the search device 100, the search query analyzing unit 160a receives the search query from the client terminal 50 (Step S101).

Then, the automaton generating unit 160b performs the automaton creation processing (Step S102), the match processing unit 160c performs the match processing (Step S103), and the search result output unit 160d outputs the search result (Step S104).

Figure 29:
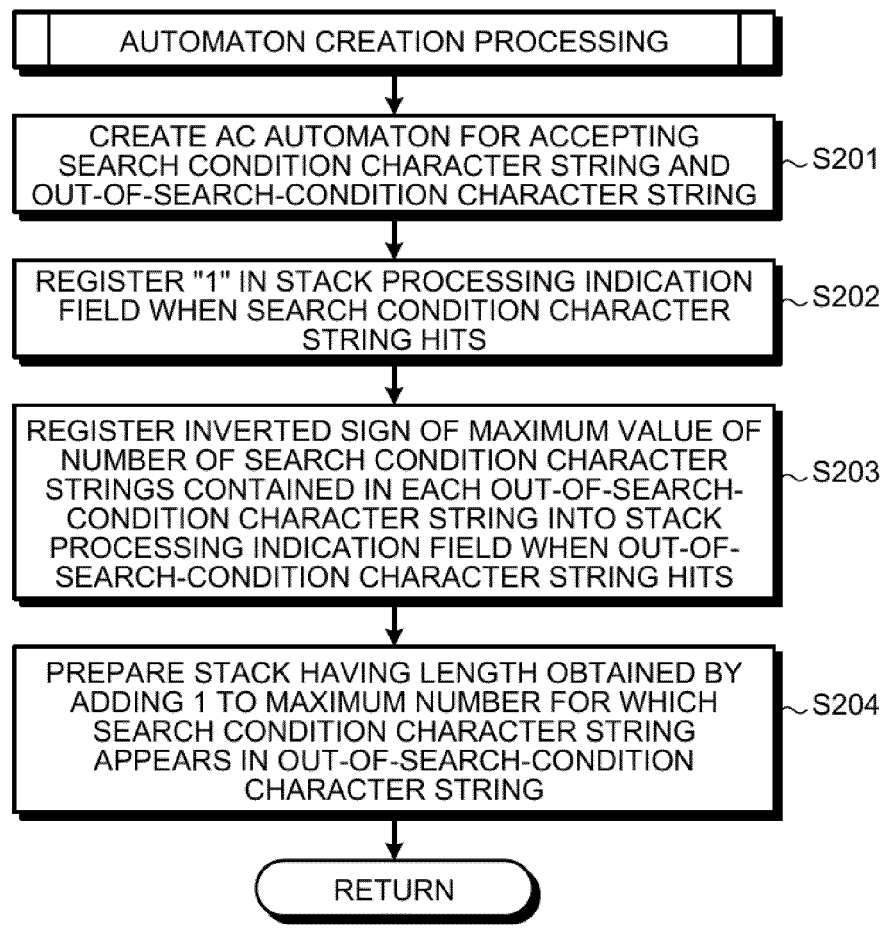
FIG. 29 is a flowchart of a processing procedure of an automaton creation processing according to the first embodiment.

The automaton creation processing depicted at Step S102 in FIG. 28 will be specifically explained below. FIG. 29 is a flowchart of the processing procedure of the automaton creation processing according to the first embodiment. When the automaton creation processing in FIG. 29 is performed, the automaton data 150b, the stack 150c and the acceptance state management table 150d are created.

As depicted in FIG. 29, the automaton generating unit 160b creates the AC automaton (automaton data 150b) for accepting the search condition character string and the out-of-search-condition character string (Step S201) and registers "1" in the stack processing indication field (the first column of the stack processing indication field in the acceptance state management table 150d) when the search condition character string hits (Step S202).

Then, the automaton generating unit 160b registers the maximum value, whose sign is inverted, of the number of search condition character strings contained in each out-of-search-condition character string into the stack indication field (the second column of the stack processing indication field in the acceptance state management table 150d) when the out-of-search-condition character string hits (Step S203).

Subsequently, the automaton generating unit 160b prepares the stack 150c whose length (the number of stack frames) is obtained by adding 1 to the maximum number for which the search condition character string appears in the out-of-search-condition character string (Step S204).

Figure 30:
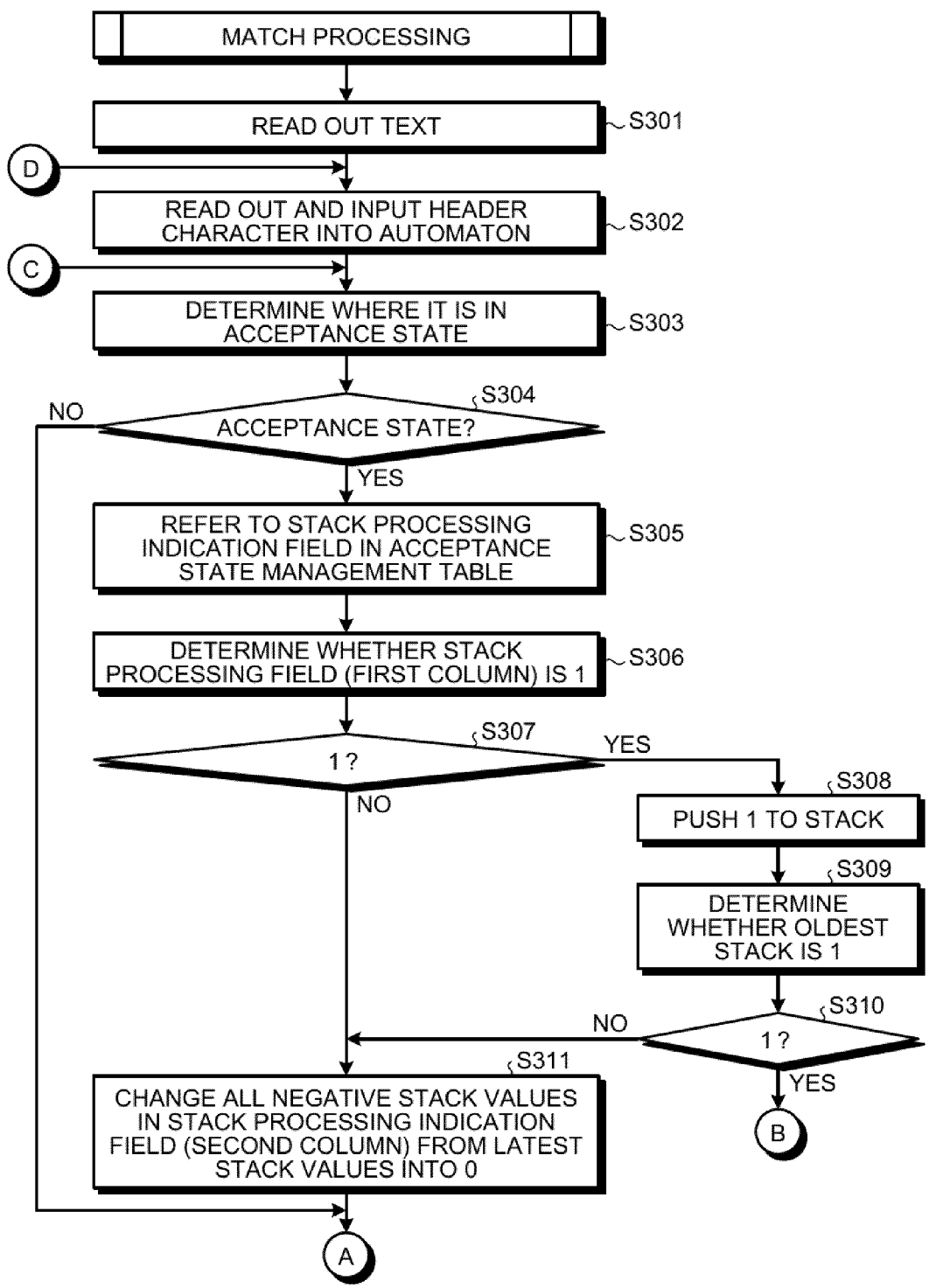
FIG. 30 is a flowchart of the processing procedure of the automaton creation processing according to the first embodiment.
Figure 31:
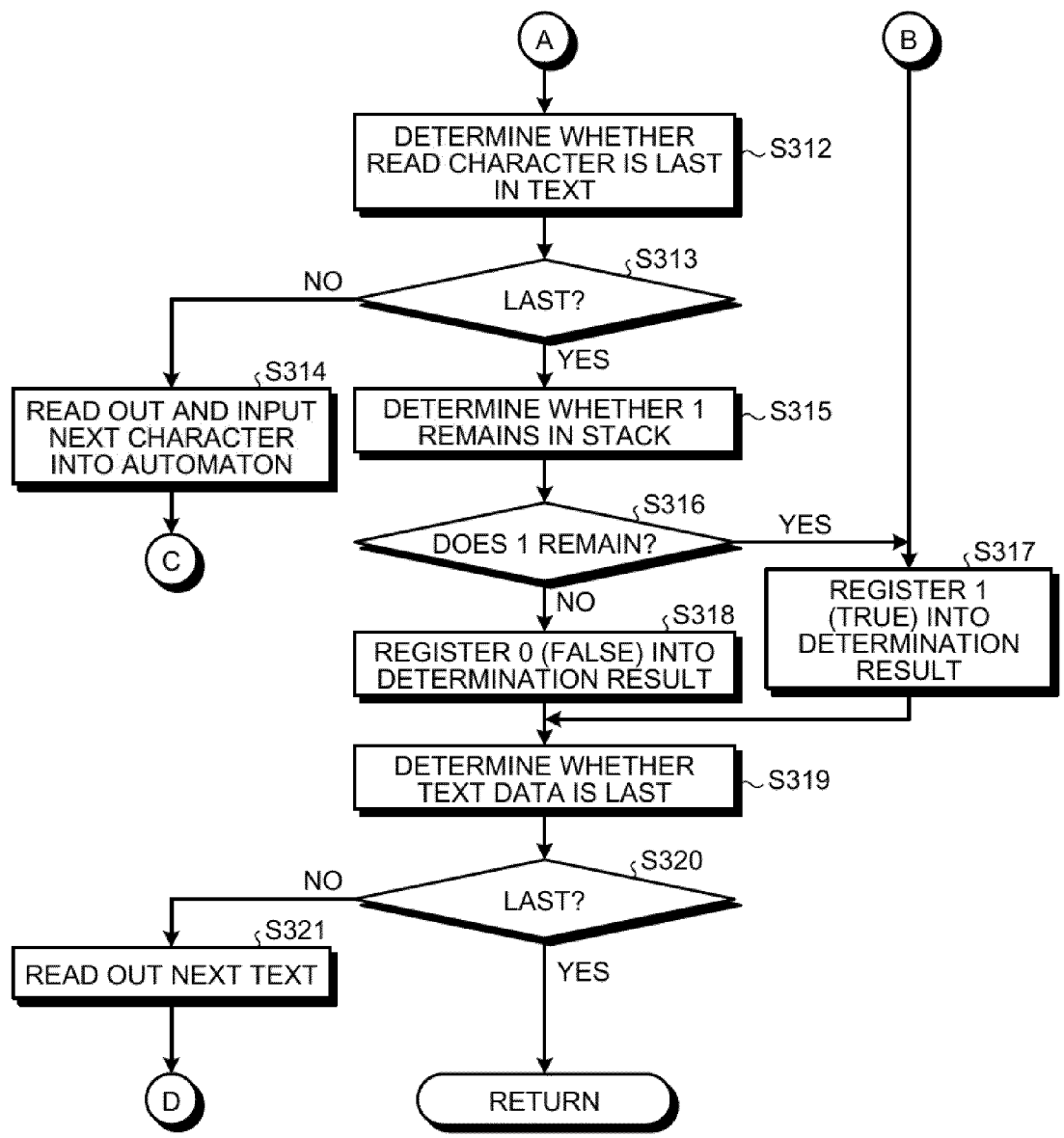
FIG. 31 is a flowchart of the processing procedure of the automaton creation processing according to the first embodiment.

A match processing depicted at Step S103 in FIG. 28 will be specifically explained below. FIGS. 30 and 31 are flowcharts of the processing procedure of the automaton creation processing according to the first embodiment. The match processing depicted in FIGS. 30 and 31 are performed so that the text to be searched can be specified.

As depicted in FIG. 30, the match processing unit 160c reads out the text from the text management table 150a (Step S301), reads out and inputs the header character of the text into the automaton data 150b (Step S302), and determines whether the node is in the acceptance state (Step S303).

The match processing unit 160c proceeds to Step S312 if the node is not in the acceptance state (No at Step S304). To the contrary, if the node is in the acceptance state (Yes at Step S304), the match processing unit 160c refers to the stack processing indication field of the acceptance state management table (the first column of the stack processing indication field) (Step S305).

The match processing unit 160c determines whether the stack processing indication field is 1 (Step S306), if the stack processing indication field is 1 (Yes at Step S307), pushes 1 (correspondence) to the stack (Step S308), and determines whether the oldest stack (stack area to be last pushed) is 1 (Step S309).

The match processing unit 160c proceeds to Step S311 if the oldest stack is not 1 (correspondence) (No at Step S310).

To the contrary, if the oldest stack is 1 (correspondence) (Yes at Step S310), the match processing unit 160c proceeds to Step S317.

The match processing unit 160c changes all the stack values from the latest stack value to one stack value of the stack processing indication field (second column) into 0 (Step S311) if the stack processing indication field (first column) is not 1 (No at Step S307).

The match processing unit 160c determines whether the read character is the last character of the text (Step S312), if not the last character (No at Step S313), reads out and inputs the next character into the automaton data 150b (Step S314), and then proceeds to Step S303.

On the other hand, the match processing unit 160c determines whether 1 (correspondence) remains in the stack 150c (Step S315) when the read character is the last character of the text (Yes at Step S313), and if 1 remains (Yes at Step S316), registers 1 (true) in the determination result corresponding to the text (Step S317) and then proceeds to Step S319.

On the other hand, the match processing unit 160c registers 0 (false) in the determination result corresponding to the text (Step S318) if 1 (correspondence) does not remain in the stack 150c (No at Step S316), and determines whether the read character is the last text data (Step S319).

The match processing unit 160c extracts the next text data from the text management table 150a (Step S321) if the text is not the last text data (No at Step S320), and proceeds to Step S302. To the contrary, if the text is the last text data (Yes at Step S320), the match processing ends.

As described above, the search device 100 according to the first embodiment creates as many stack frames as the number obtained by adding one to the number of search condition character strings contained in the out-of-search-condition character string into the stack 150c, sequentially inputs the character strings in the text into the automaton data 150b, and determines whether the character string in the text hits the search condition character string or the out-of-search-condition character string to push the correspondence to the stack 150c or to change the correspondence into the non-correspondence (to sequentially change as many correspondences as the number of the search condition character strings contained in the out-of-search-condition character string into the non-correspondence from the correspondence last registered in the stack frame), thereby determining whether the text is to be searched, so that the text to be searched can be rapidly searched and the amount of memory usage can be restricted without analyzing the structure of the text to be searched or holding the address of each character.

If the correspondence is pushed to the stack area to be last pushed among the stack areas in the stack 150c, the search device 100 according to the first embodiment can determine that the text is to be searched even when the character strings in the text are not all input into the automaton data 150b, thereby omitting unwanted processings and speeding up the processings for the text search.

The embodiment according to the present invention has been explained so far but the present invention may be applied to various different embodiments other than the first embodiment. Other embodiment within the scope of the present invention will be explained below as the second embodiment.

For example, with respect to the match processing in the first embodiment, the search device creates as many stack frames as the number obtained by adding one to the number of search condition character strings contained in the out-of-search-condition character string and determines the text to be searched but the present invention is not limited thereto and the search device can utilize an array instead of a stack to determine the text to be searched.

FIGS. 32 and 33 are diagrams for explaining the processing of the search device according to the second embodiment. As one example, the search character string is assumed as "タン"(tan), the out-of-search-condition character string is assumed as "タンタン麺"(tantanmen), and the text extracted from the storage device is assumed as "タンタン麺とロースとタンを頼んで、タンタン麺を食べた。"(tantanmen to rohsu to tan o tanonde tantanmen o tabeta).

At first, the search device creates an array in the storage device (Step S20). Then, the search device sequentially matches the character string in the text "タンタン麺とロースとタンを頼んで、タンタン麺を食べた。" (tantanmen to rohsu to tan o tanonde tantanmen o tabeta) with the search condition character string "タン"(tan) and the out-of-search-condition character string "タンタン麺"(tantanmen), and if the character string in the text hits the search condition character string, registers the correspondence (o) in the array.

On the other hand, when the character string in the text hits the out-of-search-condition character string, as many correspondences (o) in the array as the number of the search condition character strings contained in the out-of-search-condition character string are changed into the non-correspondence (x). If at least one correspondence (o) is stored in the array after all the text is read, the search device determines that the read text is to be searched. The search device can utilize the AC automaton depicted in the first embodiment to determine whether the character string hits the search condition character string or the out-of-search-condition character string.

In the example depicted in FIG. 32, since the second character in the character string of the text hits "タン"(tan), the search device registers the correspondence (o) in the array (Step S21). Then, since the fourth character in the character string of the text hits "タン" (tan), the search device registers the correspondence (o) in the array (Step S22).

Proceeding to the explanation of FIG. 33, since the fifth character in the character string of the text hits "タンタン麺"(tantanmen), the search device changes as many correspondences (o) contained in the array as two "タン"(tan) contained in "タンタン麺"(tantanmen) into the non-correspondence (x) (Step S23).

Subsequently, since the 12th character in the character string of the text hits ""タン"" (tan), the search device registers the correspondence (o) in the array (Step S24). Further, since the 19th character in the character string of the text hits ""タン"" (tan), the search device registers the correspondence (o) in the array (Step S25).

Since the 21st character in the character string of the text hits "タン"(tan), the search device registers the correspondence (o) in the array (Step S26). Since the 22nd character in the character string of the text hits "タンタン麺"(tantanmen), the search device changes as many correspondences (o) contained in the array as two "タン"(tan) contained in "タンタン麺"(tantanmen) into the non-correspondence (x).

Since at least one correspondence (o) remains in the array when all the text is read, the search device determines that the text "タンタン麺とロースとタンを頼んで、タンタン麺を食べた。" (tantanmen to rohsu to tan o tanonde tantanmen o tabeta) is to be searched.

As described above, the search device according to the second embodiment prepares the array in the storage device without calculating the stack frames, sequentially matches the character string in the text with the search condition character string and the out-of-search-condition character string, and determines the text to be searched by storing the correspondence in the array on the basis of the matching result or changing the stored correspondence into the non-correspondence, thereby omitting the processing of calculating the stack frames and simplifying the search processing.

Among the processings explained in the present embodiment, all or some processings which have been explained to be automatically performed may be manually performed, or all or some processings which have been explained to be manually performed may be automatically performed in a well-known manner. In addition, the processing procedure, the control procedure, specific names, information including various data or parameters described in the document and depicted in the drawings may be arbitrarily changed except as otherwise noted.

Each constituent of the search device 100 depicted in FIG. 4 is functionally conceptual and does not necessarily need to be physically constituted as depicted in the drawings. In other words, specific forms of distribution and integration in each device are not limited to illustrated one and all or some forms can be constituted to be functionally or physically distributed or integrated in arbitrary unit depending on various loads or usage. Further, all or any of processing functions performed in each device can be realized in a CPU (central processing unit) or a program analyzed or executed by the CPU, or can be realized in wired logic hardware.

Figure 34:
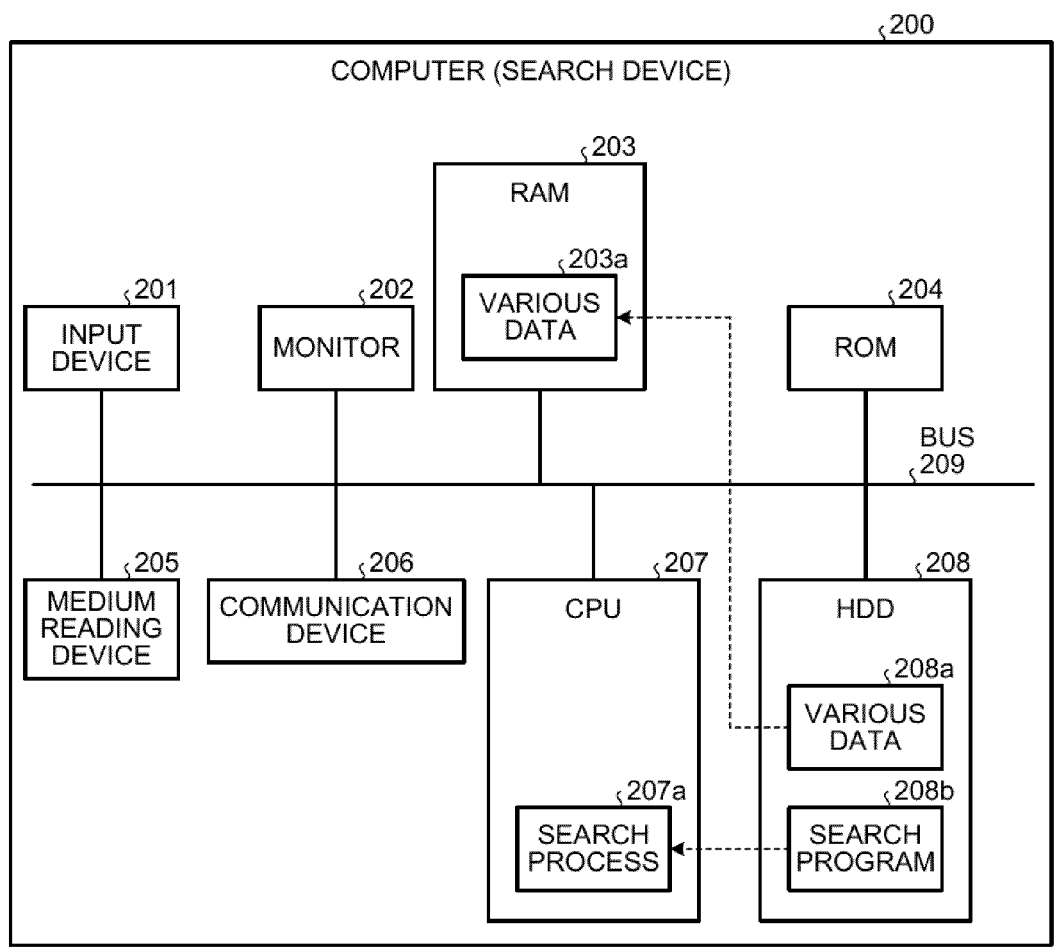
FIG. 34 is a diagram of a hardware structure of a computer constituting the search device according to the first embodiment.

FIG. 34 is a diagram of a hardware structure of a computer constituting the search device 100 according to the first embodiment. As depicted in FIG. 34, a computer (search device) 200 includes an input device 201, a monitor 202, a RAM (random access memory) 203, a ROM (read only memory) 204, a medium reading device 205 for reading data from a storage medium, a communication device 206 for exchanging data with other device (client terminal 50), a CPU 207 and an HDD (hard disk drive) 208, which are connected to each other via a bus 209.

The HDD 208 stores therein a search program 208b which exhibits a similar function as in the search device 100. The CPU 207 reads out the search program 208b for execution to activate a search process 207a.

Here, the search process 207a corresponds to the search query analyzing unit 160a, the automaton generating unit 160b, the match processing unit 160c and the search result output unit 160d in FIG. 4. The HDD 208 stores therein various data 208a corresponding to the information stored in the storage unit 150 of the search device 100. The CPU 207 reads out and stores various data 208a stored in the HDD 208 in the RAM 203, utilizes various data 203a stored in the RAM 203 to determine the text to be searched, and outputs the determination result to the client terminal 50.

The search program 208b depicted in FIG. 34 is not necessarily stored in the HDD 208 from the start. For example, the search program 208b may be stored in a "portable physical medium" inserted into the computer, such as an FD (flexible disk), a CD (compact disk read only memory), a DVD (digital versatile disk), a magnetooptical disk or an IC (integrated circuit) card, a "fixed physical medium" such as an HDD equipped inside or outside the computer, or "another computer (or server)" connected to the computer via a public line, the Internet, a LAN (local area network) or a WAN (wide area network), and may be read out by the computer therefrom for execution.

According to the search method disclosed herein, hardware resources can be saved and the text search can be performed rapidly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A search method comprising:
acquiring a first character string and a second character string, the first character string being a search term and the second character string being a term which includes the first character string;
extracting a text from a storage device storing a plurality of texts therein;
sequentially matching character strings in the text with the first character string and the second character string;
registering a first indicator in a storage unit when the first character string is found in the text;
changing the first indicator into a second indicator when the second character string is found in the text, a number of first indicators changed to the second indicator being equal to a number of first character strings included in the second character string;
the storage unit creating one or more frames including more than one area, wherein the storage unit in which the first indicator and the second indicator are registered is the frame including more than one area, and the number of areas being equal to the number of the first character strings included in the second character string plus one; and
outputting the text extracted from the storage device as a search result when the first indicator remains in the storage unit.

2. The search method according to claim 1, wherein
the first indicator and the second indicator are registered in each area of the frame, and
the text is output as the search result when the first indicator is registered in a predetermined area of the frame.

3. The search method according to claim 2, wherein
the first indicator and the second indicator move in the frame from one area to another according to a predetermined order while matching progresses, and when the first indicator moves to a last area in the frame, the text is output as the search result.

4. The search method according to claim 2, wherein
the sequentially matching creates an Aho-Corasick (AC) automaton including a node for the first character string and a node for the second character string, and inputs the text to the AC automaton,
the registering registers the first indicator in the storage unit when transition to the node for the first character string occurs,
the changing changes the first indicator into the second indicator starting from a last registered one among the registered first indicators when transition to the node for the second character string occurs.

5. A non-transitory computer readable storage medium including a search program, the search program causing a computer to execute a process comprising:
acquiring a first character string and a second character string, the first character string being a search term and the second character string being a term which includes the first character string;
extracting a text from a storage device storing a plurality of texts therein;
sequentially matching character strings in the text with the first character string and the second character string;
registering a first indicator in a storage unit when the first character string is found in the text;
changing the first indicator into a second indicator when the second character string is found in the text, a number of first indicators changed to the second indicator being equal to a number of first character strings included in the second character string;
the storage unit in which the first indicator and the second indicator are registered is a frame including more than one area, and the number of areas being equal to the number of the first character strings included in the second character string plus one; and
outputting the text extracted from the storage device as a search result when the first indicator remains in the storage unit.

6. The non-transitory computer readable storage medium according to claim 5, wherein
the first indicator and the second indicator are registered in each area of the frame, and
the text is output as the search result when the first indicator is registered in a predetermined area of the frame.

7. The non-transitory computer readable storage medium according to claim 6, wherein
the first indicator and the second indicator move in the frame from one area to another according to a predetermined order while matching progresses, and when the first indicator moves to a last area in the frame, the text is output as the search result.

8. The non-transitory computer readable storage medium according to claim 6, wherein
the sequentially matching creates an Aho-Corasick (AC) automaton including a node for the first character string and a node for the second character string, and inputs the text to the AC automaton,
the registering registers the first indicator in the storage unit when transition to the node for the first character string occurs,
the changing changes the first indicator into the second indicator starting from a last registered one among the registered first indicators when transition to the node for the second character string occurs.

* * * * *